United States Patent
Tadano

(10) Patent No.: US 8,972,724 B2
(45) Date of Patent: Mar. 3, 2015

(54) DIGITAL CONTENT MANAGEMENT SYSTEM, DIGITAL WATERMARK EMBEDDING DEVICE, DIGITAL WATERMARK DETECTION DEVICE, PROGRAM, AND DIGITAL CONTENT MANAGEMENT METHOD

(75) Inventor: Kumiko Tadano, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 13/390,278

(22) PCT Filed: Jun. 9, 2010

(86) PCT No.: PCT/JP2010/003846
§ 371 (c)(1),
(2), (4) Date: Feb. 13, 2012

(87) PCT Pub. No.: WO2011/018871
PCT Pub. Date: Feb. 17, 2011

(65) Prior Publication Data
US 2012/0140919 A1 Jun. 7, 2012

(30) Foreign Application Priority Data
Aug. 14, 2009 (JP) ................................. 2009-188083

(51) Int. Cl.
H04L 29/06 (2006.01)
G06F 21/00 (2013.01)
H04N 21/8358 (2011.01)
H04N 1/32 (2006.01)
H04N 21/2389 (2011.01)

(52) U.S. Cl.
CPC ....... *H04N 21/8358* (2013.01); *H04N 1/32149* (2013.01); *H04N 21/23892* (2013.01); *H04N 2201/3229* (2013.01)
USPC .......................................... 713/165; 380/201

(58) Field of Classification Search
CPC ......... G06F 21/10; G06F 21/60; G06F 21/16; H04N 21/8358; H04N 21/23892; H04N 1/32149; H04N 2201/3229
See application file for complete search history.

(56) References Cited

U.S. PATENT DOCUMENTS

2005/0004873 A1* 1/2005 Pou et al. .................... 705/51
2008/0295182 A1* 11/2008 Ogai ............................. 726/29

FOREIGN PATENT DOCUMENTS

JP 2006-197476 A 7/2006

OTHER PUBLICATIONS

International Search Report of PCT/JP2010/003846 dated Aug. 17, 2010.
Knut Eckstein, et al., "Data Hiding in Journaling File Systems", (USA), Digital Forensic Research Workshop (DFRWS), 2005, pp. 1-8.
Tsukasa Ono, "Denshi Sukashi to Kontentsu Hogo (Digital Watermark and Content Protection)". Feb. 2001, pp. 147-151, 59-60, 97-108, published by Ohmsha Ltd.

* cited by examiner

Primary Examiner — Izunna Okeke
(74) Attorney, Agent, or Firm — Sughrue Mion, PLLC

(57) ABSTRACT

A digital content management system (1) includes a digital watermark embedding device (100) which generates a file having a file name used as a digital watermark, and embeds it into a digital content to be managed; a digital watermark information storage device (140) which stores, as digital watermark information, the file name used as the digital watermark embedded in the digital content by the digital watermark embedding device (100), while correlating it with identification information of the digital content having the digital watermark embedded therein; and a digital watermark detection device (150) which detects the file name used as the digital watermark, stored in the digital watermark information storage device (140), from the digital content to be verified, referring to the digital watermark information stored in the digital watermark information storage device (140).

57 Claims, 17 Drawing Sheets

FIG. 3

140 DIGITAL WATERMARK INFORMATION STORAGE DEVICE

| UUID | DIGITAL WATERMARK INFORMATION (FILE NAME) |
|---|---|
| e46bd7e1-20d6-415a-8ca7-160e7d34b121 | /etc/yum.d/dummy.conf, /var/log/log123.log |
| a65ec6cc-1de1-564b-7ac5-374e7a58e345 | /usr/bin/dummy_command, /usr/local/bar_app |
| 788e8ff0-8653-11de-8a39-0800200c9a66 | /usr/sbin/dummy, /home/bar/.ssh/id_rsa_dummy |

FIG. 4

| id | vm_id | who | When | what | where |
|---|---|---|---|---|---|
| 1 | e77d2018-48ed-429c-8faa-99660ef14c0c | policy admin | 2008-02-01 10:33:10 | created | host01 |
| 2 | E77d2018-48ed-429c-8faa-99660ef14c0c | server admin | 2008-02-01 10:40:24 | deployed | vmhost24 |
| 3 | e097a937-b386-44eb-8ace-06a2fc29db5d | policy admin | 2008-12-10 14:13:53 | created | host01 |
| 4 | cdbe5536-0717-413e-8db5-00e110ba9ff2 | server admin | 2008-12-10 14:25:30 | deployed | vmhost26 |

／dir／a. txt
     c. txt (b)

／dir／a. txt

／dir／c. txt (c)

／dir／a. txt → 1
／dir／c. txt → 2

(d)

1: ／dir／a. txt
                ← ／dir／b
2: ／dir／c. txt (e)

1: ／dir／a. txt
2: ／dir／b
3: ／dir／c. txt (f)

／dir／a. txt
     b
     c. txt

DIGITAL CONTENT MANAGEMENT SYSTEM, DIGITAL WATERMARK EMBEDDING DEVICE, DIGITAL WATERMARK DETECTION DEVICE, PROGRAM, AND DIGITAL CONTENT MANAGEMENT METHOD

CROSS REFERENCE TO RELATED APPLICATIONS

This application is a National Stage of International Application No. PCT/JP2010/003846 filed Jun. 9, 2010, claiming priority based on Japanese Patent Application No. 2009-188083 filed Aug. 14, 2009, the contents of all of which are incorporated herein by reference in their entirety.

TECHNICAL FIELD

The present invention relates to a digital content management system, a digital watermark embedding device, a digital watermark detection device, a program, and a digital content management method, and in particular to a digital content management system, a method and a program designed to manage a digital content which contains a file set and thereby detecting illegality, a digital watermark embedding device designed to embed digital watermark into a digital content, and a digital watermark detection device designed to detect a digital watermark embedded in a digital content.

BACKGROUND ART

Thin client server has attracted public attention in view of enhanced security and desktop portability.

One possible form of virtual machine (VM)-based thin client server (for example, VirtualPCCenter), typically adopted by enterprise data center, allows paid software represented by Microsoft Office (registered trademark) to run thereon.

This sort of environment suffers from a risk that VM images are replicated by a malicious user or system administrator, and leaked towards a large unspecified number of people. This is because it is easy to illegally copy or alter digital contents, and also because it is easy to readily distribute digital contents over a wide range through a network, by virtue of dissemination of file conversion (P2P, or Peer-to-Peer) technique.

Accordingly, once the digital contents such as VM image including paid software are illegally leaked, it is necessary to trace them.

In recent years, techniques for tracing such digital contents have been developed (see Non-Patent Document 1, Non-Patent Document 2, for example).

Embedding of a digital watermark into the digital contents may be exemplified as one technique of tracing the digital contents. The digital watermark is a technique of embedding identification information into the digital contents, without degrading quality thereof.

Even for the case where the digital contents were illegally leaked by breaking tamper resistant technique or encryption technique for blocking license violation, the leaked digital contents can be traced by using the digital watermark.

In recent years, a technique for tracing such digital contents has been developed (see Non-Patent Document 1, for example). For digital contents relevant to pictures and sounds, a large number of digital watermarking techniques have been developed.

According to Non-Patent Document 1, those making use of frequency range or picture replacement are exemplified for picture contents, and those making use of echo or phase modification are exemplified for sound contents.

RELATED DOCUMENT

Non-Patent Document

[Non-Patent Document 1] Tsukasa ONO, "Denshi Sukashi to Kontentsu Hogo (Digital Watermark and Content Protection)", published by Ohmsha Ltd., February 2001, p. 147-151, 59-60, 97-108

[Non-Patent Document 2] Knut Eckstein et al., Data Hiding in Journaling File Systems, (USA), 2005 Digital Forensic Research Workshop (DFRWS)), 2005

DISCLOSURE OF THE INVENTION

The techniques disclosed in the above-described, Non-Patent Document have, however, been suffering from a problem that they are not adoptable to digital contents having a general-purpose file set handled by the virtual machine, since the digital watermark is embedded by a method best suited for properties of pictures and sounds.

On the other hand, there has been known a data hiding technique as described in Non-Patent Document 2, which is a technique of embedding information into general-purpose file systems.

Possible destinations of embedding of information typically include (1) area in journaling file system not subjected to integrity check, (2) area referred by no file, but reserved as a result of modification of mode, (3) embedding in contents having a specific file format (comment line in text file, for example), (4) area hidden by a device driver, (5) extended file attribute (alternate data stream, for example), (6) unused area on a partition table, and (7) unused area in a data unit at the end of file (slack space).

However, the data hiding based on the technique described in the Non-Patent Document are adoptable only when kernel, OS (Operating System), file system, file format and so forth satisfy specific conditions.

For example, (1) is not adoptable if the journaling file system is not supported, such as in a legacy system. (2) is only adoptable to the system using Linux as an OS, but not adoptable to Windows (registered trademark) based system. (3) is not adoptable if there is no file having the specific extension. (4) is not adoptable if version of the kernel is modified, since the device driver generally depends on a specific version of the kernel. (5) is not adoptable to a system not supporting the extended file attribute.

As is known from the above, the conventional data hiding techniques have not been satisfactory in view of versatility.

It is therefore an object of the present invention to provide a digital content management system, a digital watermark embedding device, a digital watermark detection device, a program, and a digital content management method, capable of solving the lack of versatility described in the above as the conventional problem.

According to the present invention, there is provided a digital content management system which includes:

a digital watermark embedding unit which generates a file having a file name used as a digital watermark, and embeds the file name into a digital content to be managed;

a digital watermark information storage unit which stores, as digital watermark information, the file name used as the digital watermark embedded in the digital content by the digital watermark embedding unit, while correlating the file name with identification information of the digital content having the digital watermark embedded therein; and a digital watermark detection unit which detects the file name used as the digital watermark, stored in the digital watermark information storage unit, from the digital content to be verified, referring to the digital watermark information stored in the digital watermark information storage unit.

According to the present invention, there is provided a digital watermark embedding device having a digital watermark embedding unit which embeds a file, having a file name used as a digital watermark, into a digital content.

According to the present invention, there is provided a digital watermark detection device having a digital watermark detection unit which detects a digital watermark by detecting a file name embedded as the digital watermark in a digital content.

According to the present invention, there is provided a first program for implementing a digital watermark embedding device which embeds a digital watermark into a digital content, configured to make a computer execute a procedure of embedding a file having a file name used as the digital watermark into the digital content.

According to the present invention, there is provided a second program for implementing a digital watermark detection device which detects a digital watermark embedded in a digital content, and is configured to make a computer execute a procedure of detecting the digital watermark by detecting a file name embedded as the digital watermark in the digital content.

According to the present invention, there is provided a first digital content management method including embedding a file having a file name used as a digital watermark into a digital content to be managed.

According to the present invention, there is provided a second digital content management method including detecting a digital watermark by detecting a file name embedded as the digital watermark in a digital content.

According to the present invention, there is provided a third digital content management method including:

embedding, by a digital watermark embedding device, which is connected to a digital watermark information storage device, a file having a file name used as a digital watermark in a digital content to be managed; and storing, by said digital watermark embedding device, into the digital watermark information storage device, as digital watermark information, the file name used as the digital watermark embedded in the digital content, while correlating the file name with identification information of the digital content having the digital watermark embedded therein.

According to the present invention, there is provided a fourth digital content management method wherein a digital watermark detection device is connected to a digital watermark information storage device which stores, as digital watermark information, a file name used as the digital watermark embedded in a digital content, while correlating the file name with identification information of the digital content having the digital watermark embedded therein. The method includes detecting, by the digital watermark detection device, the file name used as the digital watermark stored in the digital watermark information storage device, from a target digital content to be verified, referring to the digital watermark information stored in the digital watermark information storage device.

Note that also any arbitrary combinations of the above-described constituents, and any exchanges of expression of the present invention made among method, device, system, recording medium, and computer program, are effective as exemplary embodiments of the present invention.

Note also that each of various constituents of the present invention may not always necessarily be configured as an independent entity, and instead a plurality of constituents may configure a single component, a single constituent may be configured by a plurality of components, a certain constituent may be a part of other constituent, and a part of certain constituent may be shared with a part of other constituent.

While the method and the computer program of the present invention are described by sequentially enumerating a plurality of procedures, the order of enumeration does not limit the order of execution of these procedures. Accordingly, when the method or the computer program of the present invention is executed, the order of the plurality of procedures may be altered without functionally obstructing each other.

In addition, the plurality of procedures of the method and computer program of the present invention may not always be executed at different points of time. For example, a certain procedure may arise during execution of other procedure, and a part or all of execution time of a certain procedure may overlap execution time of other procedure.

According to the present invention, a digital content management system, a digital watermark embedding device, a digital watermark detection device, a program, and a digital content management method, all of which being capable of tracing general-purpose digital content containing a file set irrespective of file system, OS, kernel and format, may be provided.

BRIEF DESCRIPTION OF THE DRAWINGS

The above and other objects, features and advantages of the present invention will be more apparent from the following description of certain exemplary embodiments taken in conjunction with the accompanying drawings listed below.

FIG. 3 is a drawing illustrating exemplary structures of digital watermark information of the respective digital contents stored in a digital watermark information storage device of the digital content management system according to this exemplary embodiment.

FIG. 4 is a drawing illustrating an exemplary reference screen of digital watermark information of the digital content management system according to this exemplary embodiment.

FIG. 5 is a drawing for explaining processes executed by the file name decision unit of the digital content management system of this exemplary embodiment.

DESCRIPTION OF THE EXEMPLARY EMBODIMENTS

Figure 1:
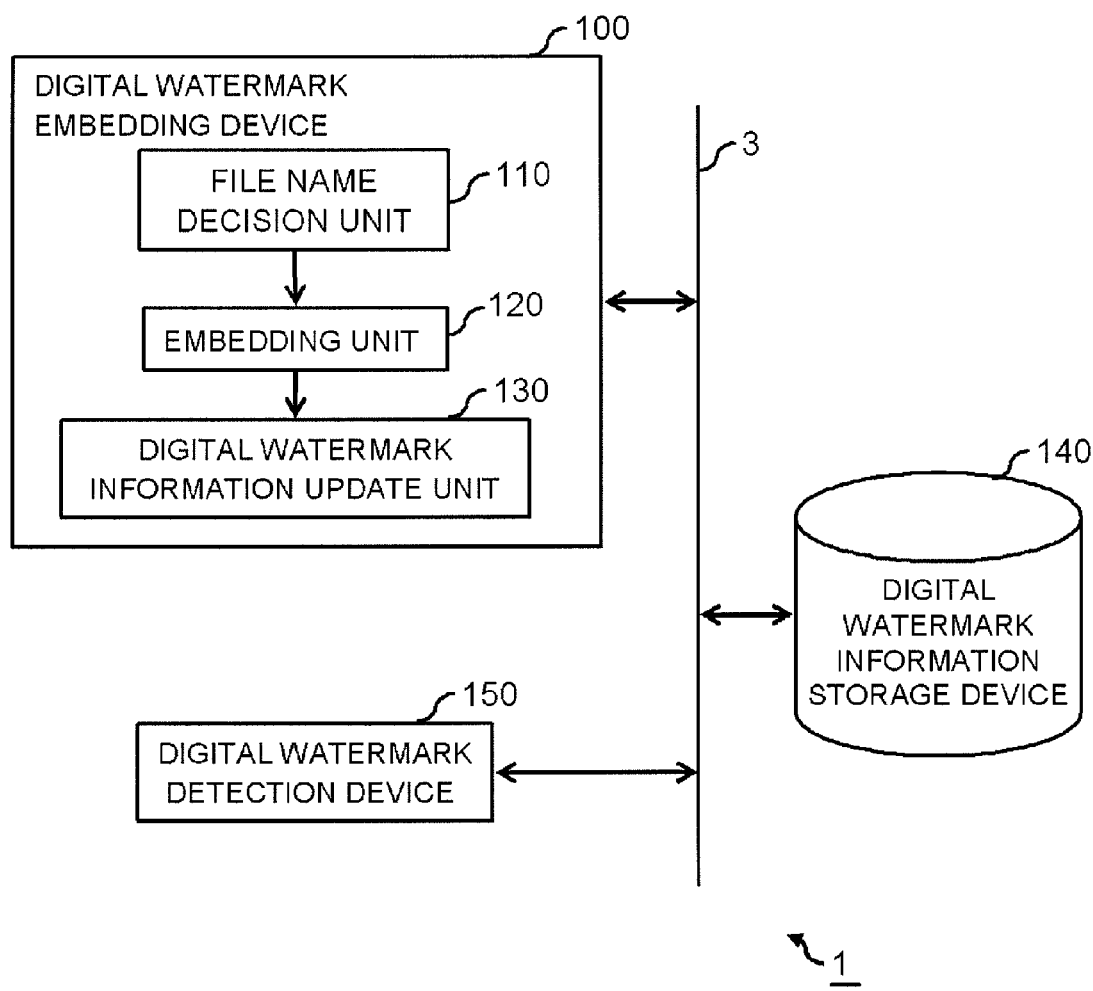
FIG. 1 is a functional block diagram illustrating a configuration of a digital content management system according to one exemplary embodiment of the present invention.

Exemplary embodiments of the present invention will be explained below, referring to the attached drawings. Note that, in all drawings, similar constituents will be given similar reference numerals or symbols, and explanations therefore will not be repeated.
(First Exemplary Embodiment)

FIG. 1 is a functional block diagram illustrating a configuration of a digital content management system 1 according to an exemplary embodiment of the present invention.

The digital content management system 1 of this exemplary embodiment embeds a digital watermark into a digital content to be managed, and enables tracing of the digital content to be managed by detecting the digital watermark from the digital content to be verified, when illegal copying of the digital content is suspected thereafter. The digital content management system 1 of the present invention is also applicable to copyright management of digital contents.

The digital content management system 1 of this exemplary embodiment uses a file name, as the digital watermark to be embedded into the digital content. A destination of embedding of digital watermark information herein is not a content of a file, in other words, the digital watermark information is not written into the file, but the file name per se is the digital watermark itself. Accordingly, the digital watermark can be embedded into whatever digital contents used on the system in which the file can exist, irrespective of OS (Linux, Windows (registered trademark), etc.), file system (NTFS, FAT32, EXT2, EXT3, etc.), hardware (CD-ROM, DVD-ROM, hard disk) and so forth.

The file name in this exemplary embodiment is defined as an absolute path including a file and a directory (folder). In this exemplary embodiment, the digital content to be managed includes a file set. It includes typically a virtual machine image file or the like. Alternatively, the digital content may include, for example, game software, and application program stored in media such as a CD or DVD. Even for the digital contents which seem to contain no file at a glance, in such a way that the file is hidden by using a data hiding technique so as to be non-discriminable from random data at a glance, or in such a way that the file is compressed to form a part of other data, the present invention is applicable when the digital content becomes accessible to files by unlocking the hidden state as occasions demand, or by extracting the compressed data.

As described in the above, the digital content management system 1 of this exemplary embodiment may be used in combination with the various data hiding techniques described in the aforementioned Non-Patent Document 2. Accordingly, intensity of the digital watermark may be improved by combining a plurality of techniques.

The digital content management system 1 of this exemplary embodiment has a digital watermark embedding device 100 which generates a file having a file name used as a digital watermark, and embeds the file name into a digital content to be managed; a digital watermark information storage device 140 which stores, as digital watermark information, the file name used as the digital watermark embedded in the digital content by the digital watermark embedding device 100, while correlating the file name with identification information of the digital content having the digital watermark embedded therein; and a digital watermark detection device 150 which detects the file name used as the digital watermark, stored in the digital watermark information storage device 140, from the digital content to be verified, referring to the digital watermark information stored in the digital watermark information storage device 140.

In short, the digital content management system 1 of this exemplary embodiment has the digital watermark embedding device 100, the digital watermark information storage device 140, and the digital watermark detection device 150. The digital watermark embedding device 100, the digital watermark information storage device 140, and the digital watermark detection device 150 are connected to each other through a network 3.

While FIG. 1 shows a configuration by which the digital watermark embedding device 100, the digital watermark information storage device 140, and the digital watermark detection device 150 are connected with each other through the network 3, the configuration is not limited thereto. For example, at least two of the digital watermark embedding device 100, the digital watermark information storage device 140, and the digital watermark detection device 150 may be configured in a single device, in other words, may be located on the same host.

The digital watermark embedding device 100 and the digital watermark information storage device 140 may be implemented, for example by a server computer, a personal computer, or by equivalent devices. The computer has a CPU (Central Processing Unit), a memory, a hard disk, and a communication device, and is connected to input devices such as a keyboard and a mouse, and also to output devices such as a display and a printer, all of which are not shown in the drawings. The individual functions of the individual units may be implemented when the CPU reads out the program from the hard disk into the memory, and executes it. Note that the drawings referred to hereinbelow do not show configurations of portions irrelevant to the essence of the present invention.

Each constituent of the digital content management system 1 may be implemented by an arbitrary combination of hardware and software, mainly contributed by a CPU of an arbitrary computer, a memory, a program loaded on the memory so as to implement the constituent illustrated in the drawing, a storage unit such as hard disk which stores the program, and an interface for network connection. Those skilled in the art may understand various modifications derived from the methods of implementation and relevant devices. The drawings explained below illustrate function-based blocks, rather than hardware-based configuration.

As illustrated in FIG. 1, the digital watermark embedding device 100 of the digital content management system 1 of this exemplary embodiment has a file name decision unit 110, an embedding unit 120, and a digital watermark information update unit 130.

In the digital watermark embedding device 100, the file name decision unit 110 generates a file name used as the digital watermark. For more details, it determines one or more file names used as the digital watermark embedded into the digital content to be managed. The digital content to be managed may be accepted after being read out from the other devices through the network 3, or read out from various media such as DVD, CD, Blue-ray disk, hard disk and various memory cards.

The embedding unit 120 embeds the digital watermark generated by the file name decision unit 110 into a target the digital content. In other words, the embedding unit 120 generates a file having a name determined by the file name decision unit 110 in the digital content.

The digital watermark information update unit 130 stores information of the digital watermark embedded by the embedding unit 120 in the digital watermark information storage device 140, while correlating the digital watermark information with the digital content.

The digital watermark information storage device 140 stores the information which specifies one or more file names used as the digital watermark(s) embedded in the digital content to be managed. In addition to the digital watermark information regarding the digital content to be managed, also identifier information for retrieval, owner information of the digital content, a user-friendly name of the digital content, a history of operations made on the digital content, physical location of the digital content and so forth may be stored together therewith. The information stored in the digital watermark information storage device 140 is typically stored, as illustrated in FIG. 3, as a set of file names while being correlated with Universally Unique Identifier (UUID) used for identifying the digital contents.

While FIG. 3 shows an exemplary case where two files are correlated to respective digital content, the number of files used as the digital watermarks embedded in respective digital content is not limited to two. The number of digital watermarks to be embedded may be set by an administrator of the digital content management system 1, and may be configured to accept occasional alteration of the setting. Alternatively, the number of digital watermarks to be embedded may automatically be altered, depending on the number of files in the digital content. For example, the number may be set in terms of percentage relative to the total number of files in the digital content.

The information stored in the digital watermark information storage device 140 may be referred through other computers, by a user who has an access right to the digital watermark embedding device 100, the digital watermark detection device 150, or to the digital watermark information storage device 140, or by an administrator of the digital content management system 1. Accordingly, a reference screen 142 of the digital watermark information as illustrated in FIG. 4 may be displayed. Other screens explained below are output in a similar manner. Alternatively, necessary information may simply be displayed as a command line.

The reference screen 142 of the digital watermark information may also display a list which typically contain identifier information (id) for retrieval, UUID (vm_id) of a VM image file of the digital content to be managed, owner information (who) of the digital content, a history of operations (when, what) made on the digital content, physical location (where) of the digital content, and so forth.

Referring now back to FIG. 1, the digital watermark detection device 150 detects the digital watermark, by confirming whether one or more file names used as the digital watermark(s) stored in the digital watermark information storage device 140 are found in the digital content to be verified. In other words, the digital watermark detection device 150 detects the digital watermark, by detecting the file names(s) embedded as the digital watermark in the digital content.

The digital content to be verified may be accepted after being read out from the other devices through the network 3, or read out from various media such as DVD, CD, Blue-ray disk, hard disk and various memory cards.

In this exemplary embodiment, the digital content management system may additionally have a target digital content detection unit (not illustrated) which detects, as a target digital content to be managed, the digital content from which the file name used as the digital watermark is detected by the digital watermark detection device 150.

In this exemplary embodiment, the digital watermark embedding device 100 may deal with a plurality of digital contents to be managed, and may embed the digital watermarks respectively into the respective digital contents, and the digital watermark information storage device 140 may respectively store, as the digital watermark information, the file names used as the digital watermarks embedded in the respective digital contents, while correlating the file names with identification information of the respective digital contents.

Figure 2:
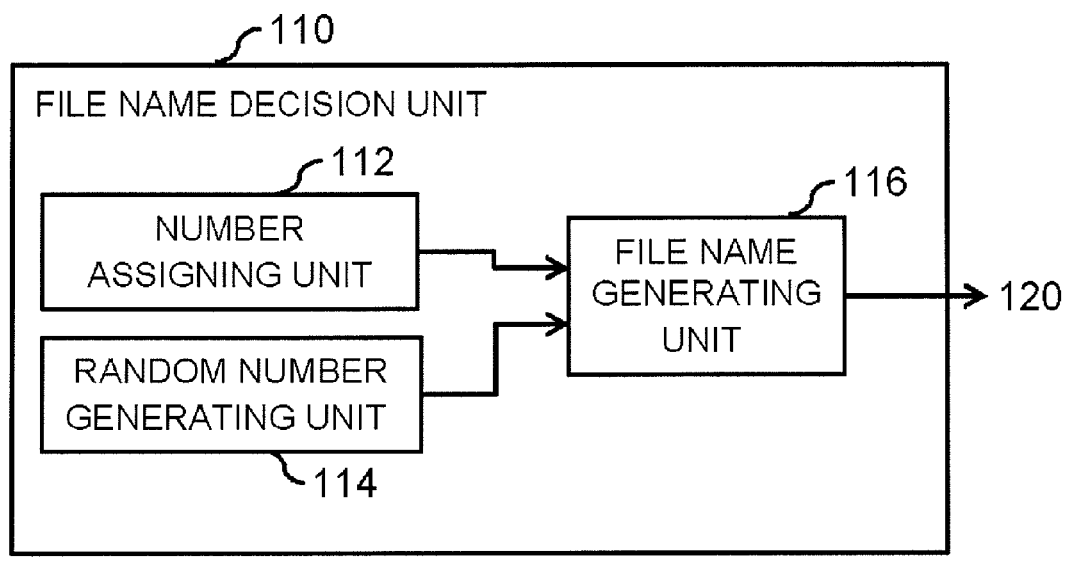
FIG. 2 is a block diagram illustrating a configuration of a file name decision unit of a digital watermark embedding device of the digital content management system according to the exemplary embodiment.

FIG. 2 is a functional block diagram illustrating a configuration of the file name decision unit 110 of the digital watermark embedding device 100 of the digital content management system 1 according to this exemplary embodiment.

In the digital content management system 1 of this exemplary embodiment, the file name decision unit 110 has a number assigning unit 112 which detects the file names, or the file names including directory names, of the files contained in the digital content, and assigns different numbers to the respective detected file names; a random number generating unit 114 which generates a random number; and a file name generating unit 116 which specifies the file name having the assigned number corresponding to the generated random number, and generates the file name used as the digital watermark based on the specified file name. The embedding unit 120 generates the file having the file name generated by the file name decision unit 110, and embeds the file as the digital watermark into the digital content.

More specifically, as illustrated in FIG. 2, the file name decision unit 110 in this exemplary embodiment has the number assigning unit 112, the random number generating unit 114, and the file name generating unit 116.

The number assigning unit 112 assigns numbers to absolute paths containing all files and directories in the digital content, and determines unique numbers corresponding to the respective file names and directory names. For example, a possible method may be such as assigning numbers according to the descending alphabetical order of the file names and directory names. Alternatively, the names of the absolute paths including all files and directories are processed by hash function, and the obtained hash values may be sorted in an ascending or descending order, and then the numbers may be assigned to the respective hash values.

The random number generating unit 114 generates the random number(s). One known method of generating the random number(s) is Blum Blum Shub algorithm used for generating cryptographic pseudo-random numbers which are not readily predictable.

The file name generating unit 116 determines heading character string(s) used as the digital watermark(s), so as to make the heading character string correspond with value(s) of the random number(s) generated using the random number generating unit 114, based on correspondence of the file name(s), or file name(s) including directory name(s), of the file(s) to the value(s) given by the number assigning unit 112. The heading character string(s) generated herein may be used, without modification, as the file name(s) generated as the digital watermark(s).

While FIG. 3 exemplified relatively short file names, the length of file name is not limited thereto.
Relatively long file names, such as etc/bash_completion.d/ uhqNxCKTAdJOXC4UR or usr/share/doc/sudo/ changelogCj5YUX1.gz may be used.

For the case where the number assigning unit 112 assigned the numbers according to a rule other than alphabetical order, the file name generating unit 116 may not necessarily generate the heading character string as the file name used as the digital watermark, but may be good enough to generate a file name so as to make the generated file name correspond to the file name specified by the random number, in compliance with a certain rule.

For example, the file name generating unit 116 may generate, as the digital watermark, a file name similar to the file name specified based on the random number generated by the random number generating unit 114, and based on the numbers assigned by the number assigning unit 112. For example, the file name may be determined as the digital watermark so as to include a part of a character string of the specified file name, or path. It is more preferable to determine a part of character string extracted from the head as the file name. Furthermore, the file name may be given additional portions other than that of the above character string. Moreover, the file name may be further added with an extension.

A specific example will be illustrated in FIG. 5. As seen in FIG. 5(*a*), given that files named a.txt and c.txt reside in a directory named /dir/ in the digital content to be managed. As seen in FIG. 5(*b*), in a case where the paths of the two files /dir/a.txt and /dir/c.txt are rearranged in an alphabetical order and added with numerals, the number assigning unit 112 gives 1 to /dir/a.txt, and 2 to /dir/c.txt, as illustrated in FIG. 5(*c*).

On the other hand, in a case where a cryptographic pseudo-random number generated by the random number generating unit 114 is 2, as illustrated in FIG. 5(*d*), a file used as the digital watermark is inserted between the /dir/c.txt on the second place and the /dir/a.txt placed ahead thereof. The file name generating unit 116 then generates a new file having a name which begins with the heading character string of /dir/b. The file name /dir/b corresponds to the digital watermark. As a consequence, as illustrated in FIG. 5(*e*), the alphabetical order of the files is given by /dir/a.txt for the first place, /dir/b for the second place, and /dir/c.txt for the third place. The file name of the file used for the digital watermark may alternatively be synthesized, by further generating an additional character string succeeding to the heading character string and by combining the both. In this case, possible ways include a method of producing a random character string (the aforementioned /dir/b is modified into /dir/bbb, for example), and a method of adding an extension to the file name (the aforementioned /dir/b is modified into /dir/b.txt, for example). In this way, as illustrated in FIG. 5(*f*), a directory named /dir/ includes three files named a.txt, b, and c.txt.

It is to be stipulated that, there is another simple method, although weak in terms of security, of embedding a file having a predetermined name used as the digital watermark into the target digital content, rather than automatic generation of a file name by the file name decision unit 110.

In short, the digital watermark embedding device 100 is good enough to embed a file having a file name used as the digital watermark into the digital content. The digital watermark information storage device 140 in this case is omissible.

As described in the above, in the digital content management system 1 of this exemplary embodiment, the digital watermark embedding device 100 and the digital watermark detection device 150 are configured to implement the above-described individual units in the form of various functions, when the CPU executes various process operations correspondent to the computer program.

The computer program of this exemplary embodiment is described so as to make a computer, which is configured to implement the digital watermark embedding device 100 for embedding the digital watermark into the digital content, execute a procedure of embedding a file having a file name used as the digital watermark into the digital content.

Again, the computer program of this exemplary embodiment is described so as to make a computer, which is configured to implement the digital watermark detection device 150 for detecting a digital watermark embedded in the digital content, execute a digital watermark detection procedure of detecting a digital watermark by detecting a file name embedded as the digital watermark into the digital content.

The computer program of this exemplary embodiment may be stored in a computer-readable storage medium. The storage medium is not specifically limited, and allows various forms. The program may be loaded from the storage medium into a memory of a computer, or may be downloaded through a network into the computer, and then loaded into the memory.

Operations of the thus-configured digital content management system 1 of this exemplary embodiment will be explained below.

In this exemplary embodiment, there are two major flows including a digital watermark embedding process and a digital watermark detection process.

In the digital watermark embedding process, the digital watermark embedding device 100 embeds the digital watermark by generating one or more file names used as the digital watermark(s), and by then newly generating a file having each thus-generated name in the digital content. The digital watermark embedding device 100 also records file names, thus generated as the digital watermark(s), so as to be used for collation later.

In the digital watermark detection process, the digital watermark detection device 150 detects the digital watermark from the target digital content, by collating whether the file having the name thus generated as the digital watermark is found in the target digital content or not.

Figure 6:
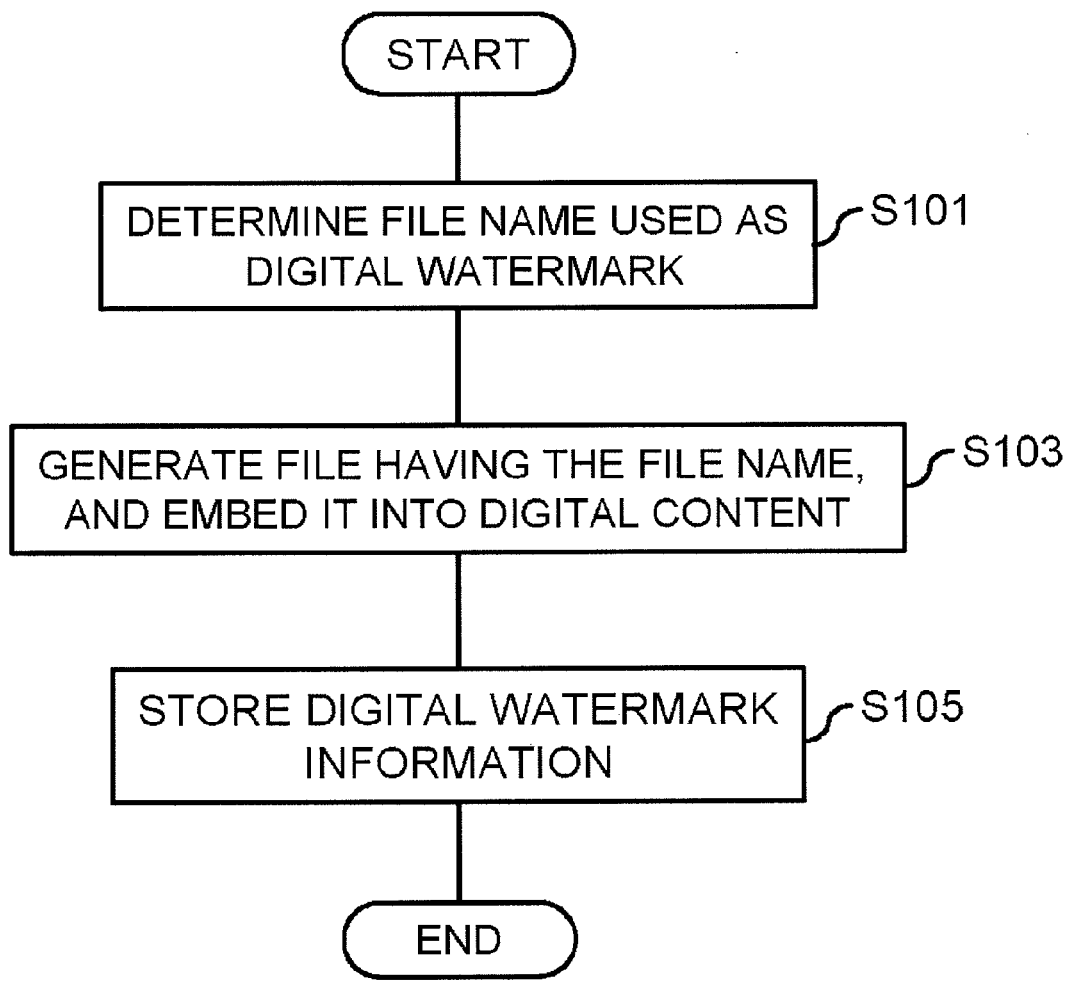
FIG. 6 is a flow chart illustrating exemplary operations in a digital watermark embedding process executed by the digital content management system of this exemplary embodiment.
Figure 7:
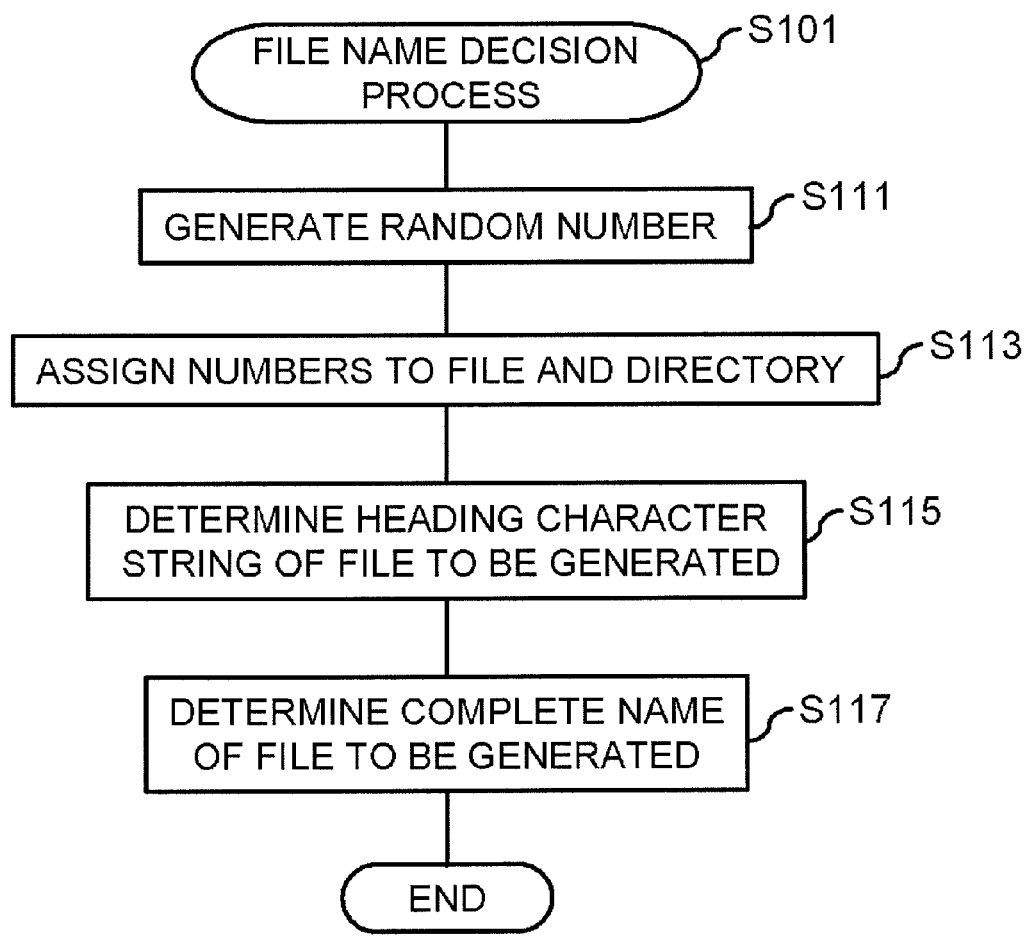
FIG. 7 is a flow chart illustrating exemplary operations in a file name decision process executed by the digital content management system of this exemplary embodiment.

FIG. 6 illustrates an exemplary operation of the digital watermark embedding process proceeded in the digital content management system 1 of this exemplary embodiment. FIG. 7 illustrates an example of detailed operation of the file name decision process, in the digital watermark embedding process illustrated in FIG. 6. FIG. 10 illustrates an exemplary operation of the digital watermark detection process proceeded in the digital content management system 1 of this exemplary embodiment. FIG. 8, FIG. 9, FIG. 11, and FIG. 12 illustrate exemplary screens which appear in the individual processes proceeded in the digital content management system 1 of this exemplary embodiment. The description will be made referring to FIG. 1 to FIG. 12.

The description begins with explanation of the digital content management method executed by the digital watermark embedding device 100 of this exemplary embodiment.

According to the digital content management method of this exemplary embodiment, a file having a file name used as the digital watermark is embedded into a digital content to be managed (step S103 in FIG. 6). The method further includes: detecting the file names, or file names including directory names, of the files contained in the digital content, and assigning different numbers to the respective detected file names (step S113 in FIG. 7); generating a random number (step S111 in FIG. 7); specifying the file name having the assigned number corresponding to the generated random number, and generating the file name used as the digital watermark based on the specified file name (step S117 in FIG. 7); and embedding, as the digital watermark, the file having the generated file name into the digital content.

<Digital Watermark Embedding Process>

First, the digital watermark embedding process of this exemplary embodiment will be explained.

Specifically, as illustrated in FIG. 6, the digital watermark embedding device 100 determines and generates, using the file name decision unit 110, the file names of the files used as the digital watermarks to be embedded into the target digital content (step S101). The digital watermark embedding device 100 then newly generates, using the embedding unit 120, the files having the file names used as the digital watermarks generated in step S101, and embeds them into the target digital content. The digital watermark embedding device 100 records, using the digital watermark information update unit 130, the digital watermarks generated in step S101, into the digital watermark information storage device 140 (step S105).

The order of execution of steps S103 and S105 may be inverted.

Process in step S101 in the flow chart illustrated in FIG. 6 will further be detailed, referring to FIG. 7. The random number generating unit 114 generates the random numbers, the number of which is same as the number of files used as the digital watermarks (step S111). Increase in the number of files may enhance redundancy, but may increase the process time and file volume. An exemplary method of determining the number of files may be such as finding the largest number capable of suppressing the volume of the digital content to equal to or lower than a predetermined value after being embedded with the digital watermarks.

Next, the number assigning unit 112 assigns the numbers to the files and directories in the digital content, so as to determine unique numbers corresponding to the respective file names and directory names, or absolute paths (step S113). For example, a possible method may be such as assigning numbers according to the alphabetical order of the paths.

Next, the file name generating unit 116 determines heading character string which corresponds to the random number generated by the random number generating unit 114, out of the paths which are assigned to the values by the number assigning unit 112 (step S115). The heading character string generated herein may be used, without modification, as the file names generated as the digital watermarks.

Next, the file name generating unit 116 generates character strings which follow the heading character string determined in step S115, thereby determines a final file name, or complete file name to be generated, (step S117). Possible methods adoptable herein include a method of generating random character strings to be added thereto, or a method of adding an extension to each file name.

Figure 8:
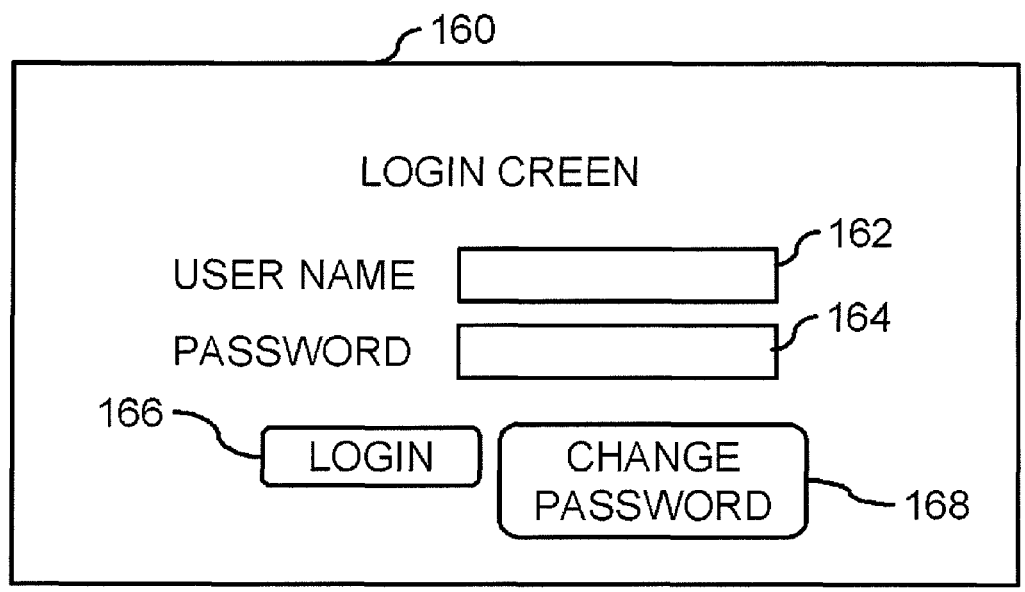
FIG. 8 is a drawing illustrating an exemplary login screen of the digital content management system of this exemplary embodiment.

In the digital content management system 1 of this exemplary embodiment, when the program of the digital content management system 1 is activated, the digital watermark embedding device 100 or the digital watermark detection device 150 typically prompts the user to enter a user name and a password respectively into a user name entry field 162 and a password entry field 164 on a login screen 160 illustrated in FIG. 8, and accepts the user name and the password entered by the user. In response to acceptance upon pressing of a login button 166, only a user verified based on the accepted user name and the password is permitted to use the system.

Note that a method of verifying the user is not limited thereto, allowing various methods of verification generally adopted. For example, it may be biometrics authentication, or verification using an ID card or the like. On the login screen 160, the user may suitably change the password by pressing the password change button 168 to move to a password change screen (not illustrated).

Figure 9:
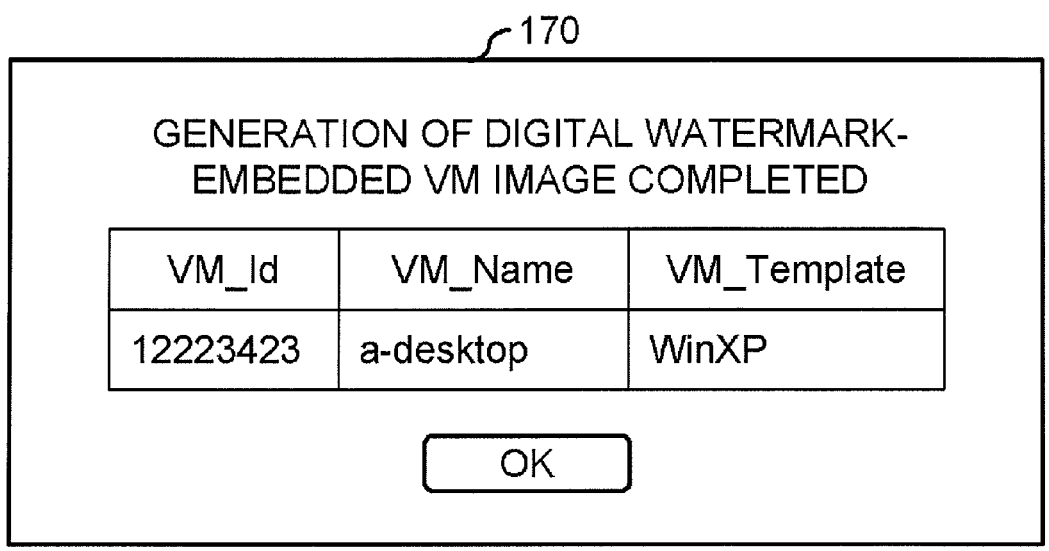
FIG. 9 is a drawing illustrating an exemplary screen for announcing completion of generation in the digital watermark embedding process executed by the digital content management system of this exemplary embodiment.
Figure 10:
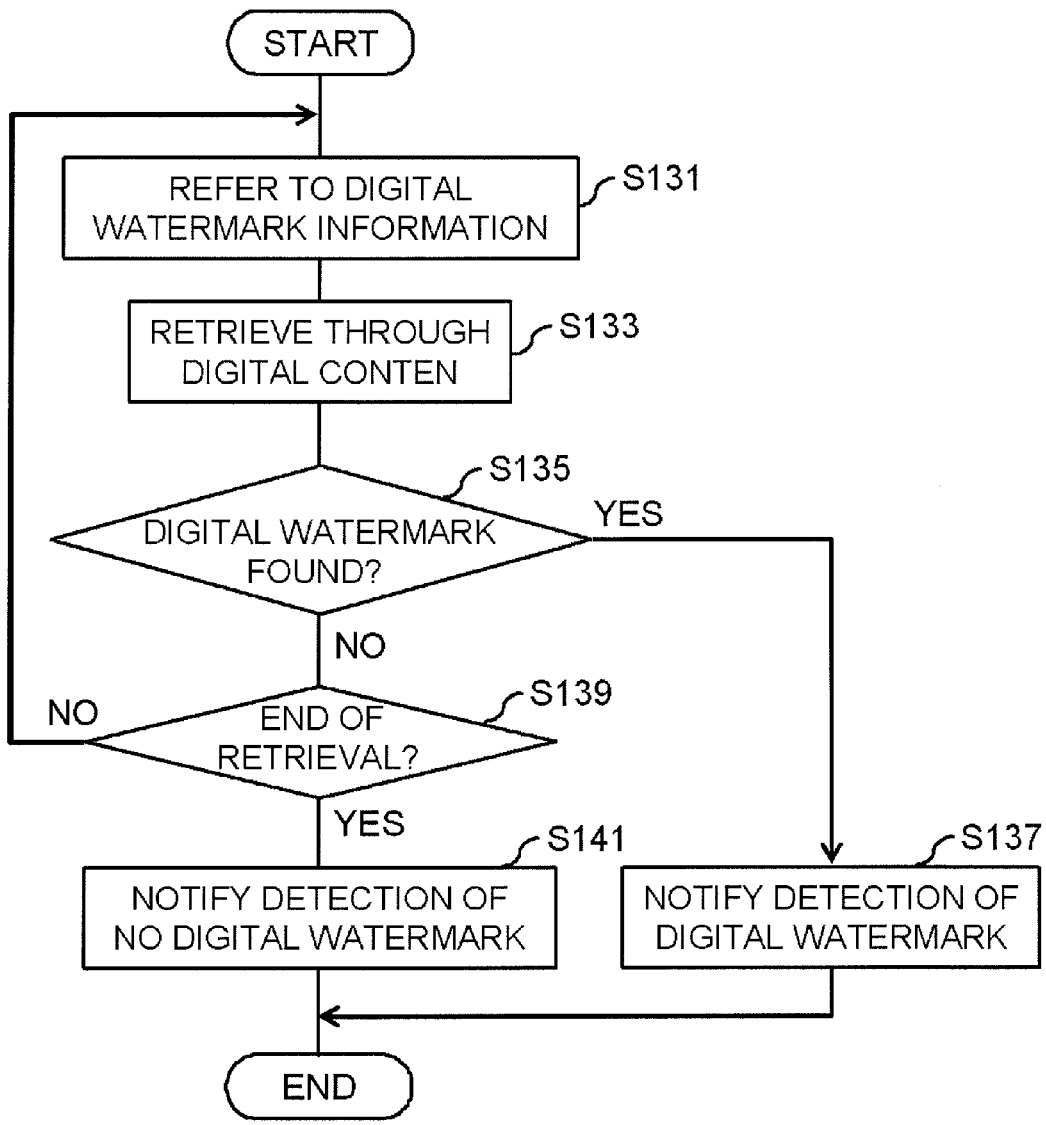
FIG. 10 is a flow chart illustrating exemplary operations of a digital watermark detection process of the digital content management system according to this exemplary embodiment.

In the digital content management system 1 of this exemplary embodiment, upon completion of the embedding process of the digital watermarks by the digital watermark embedding device 100, a completion announcement screen 170 as illustrated in FIG. 9 is presented to the user. A method of the presentation to the user is not limited to display on the screen, and allows various modes such as display of a command line, recording into a log file, announcement through a mail or messenger, printing in a report, and so forth.

FIG. 9 illustrates an exemplary case where a VM image which serves as the digital content to be managed is generated, concurrently with embedding of the digital watermarks.

<Digital Watermark Detection Process>

Next, digital watermark detection process of this exemplary embodiment will be explained.

Specifically, as illustrated in FIG. 10, digital watermark detection device 150 refers to, and reads out information of the digital watermarks from the digital watermark information storage device 140 (step S131). Next, the digital watermark detection device 150 retrieves through the target digital content, and collates whether the files having the file names used as the digital watermarks reside in the target digital content, based on the information read out in step S131 (step S133). When there is a digital watermark in the target digital content (YES in step S135), the digital watermark detection device 150 notifies the user of detection of the digital watermarks (step S137), and terminates the process. When there is no digital watermark in the target digital content (NO in step S135), and when the retrieval through the digital content have ended (YES in step S139), the digital watermark detection device 150 notifies the user that the digital watermark is not detected (step S141), and terminates the process. When the retrieval through the digital content has not completed (NO in step S139), the process goes back to step S131 so as to continue the retrieval.

When the target digital content has suffered from attacks such as removal or falsification of the digital watermarks, the files used as the digital watermarks may partially be lost. In this case, it is possible to judge whether the digital watermark is detected or not, typically by preliminarily determining judgment criteria describing that coincidence of to what number of files may give a base for judgment of the digital watermarks. The judgment criteria may be accepted through an unillustrated setting screen, and may be stored in a memory.

Figure 11:
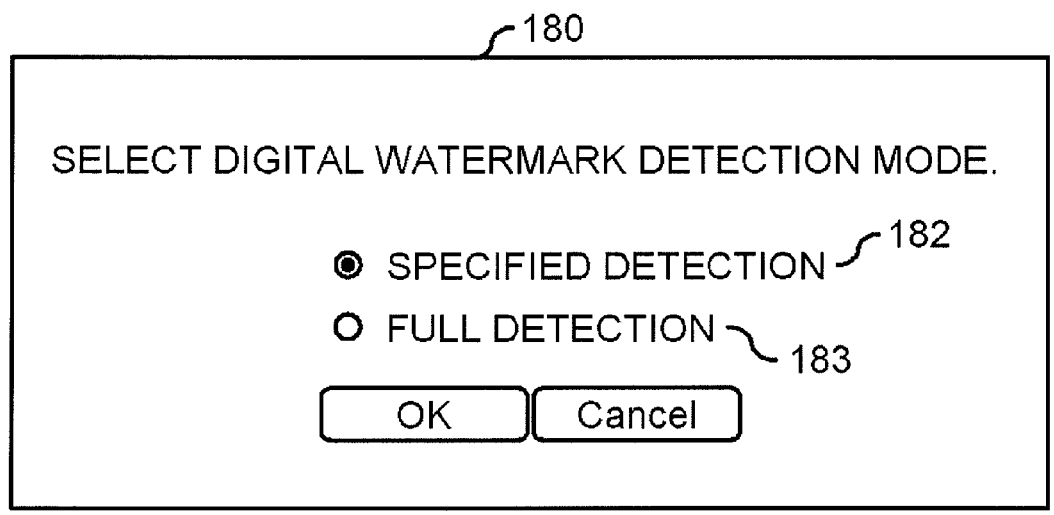
FIG. 11 is a drawing illustrating an exemplary screen for selecting a digital watermark detection mode in the digital content management system of this exemplary embodiment.

In the digital watermark detection process, typically as illustrated in FIG. 11, a range of detection may be set on a detection mode selection screen 180. For an exemplary case where there are a plurality of digital contents to be verified, either a method of retrieving while specifying the contents (specified detection 182), or a method of exhaustively retrieving the contents without specifying them (exhaustive detection 183) is selectable. When suspicious contents have already been specified to some degree, the specified detection 182 is selectable. Since the specified detection 182 may accept ID information or the like of the target contents to be verified thereby allowing retrieval through the thus specified contents and detection of the digital watermarks, so that time of retrieval may be shortened and the specified detection 182 is therefore efficient, as compared with the exhaustive detection 183 for retrieving the contents in a round-robin manner.

Figure 12:
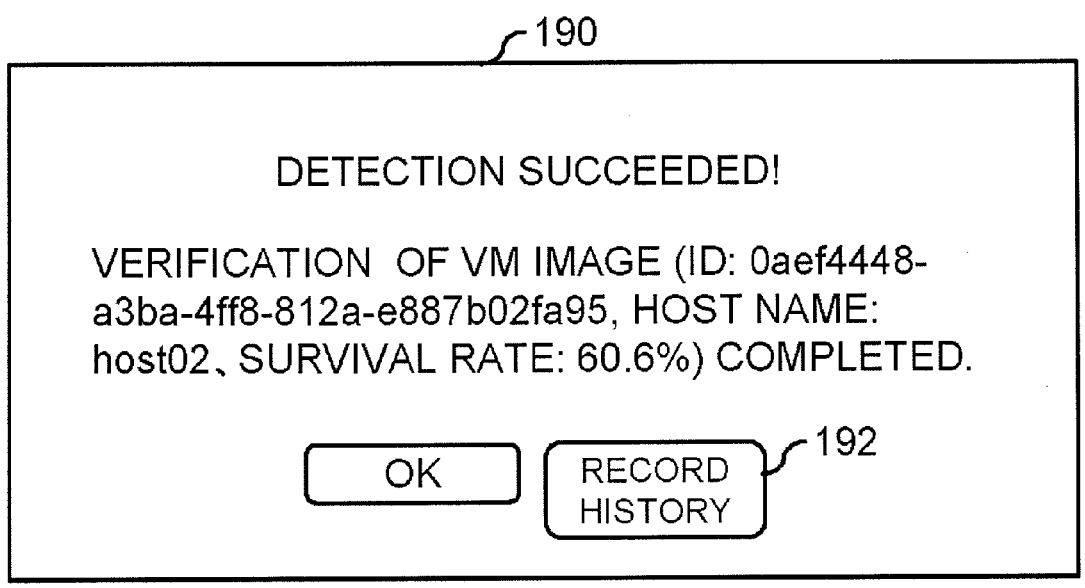
FIG. 12 is a drawing illustrating an exemplary screen which appears upon detection of the digital watermark in the digital watermark detection process in the digital content management system of this exemplary embodiment.

As illustrated in FIG. 12, after completion of the retrieval of the digital watermarks, a result screen 190 is displayed. This drawing shows an exemplary case where the digital content to be verified is a VM image. The result screen 190 shows whether the digital watermark was detected or not. As seen in the drawing, the result screen 190 may contain other information on the digital content, such as an UUID, host name, and survival rate of the VM image. The survival rate herein means a percentage of rightly remained digital contents without being modified, even when the digital contents have been attacked. This may be inferred typically from the survival rate of the digital watermarks. Upon acceptance of pressing of a history recording button 192, results of verification may be recorded into a history. Alternatively, the results may automatically be recorded into the history, upon completion of the retrieval.

As explained in the above, according to the digital content management system 1 of this exemplary embodiment, the digital watermark embedding device 100 is able to trace the general-purpose digital contents which contain a file set, irrespective of file system, OS, kernel, format or the like, by using the file names of the files to be embedded into the digital contents as the digital watermarks.

Since the digital watermark embedding device 100 correlates the identification information of the digital content to be managed with the file names used as the digital watermarks, and the file names are embedded as the digital watermark information, so that it is hard to recognize that the identification information of the contents is hidden, but it is easy to detect it.

Since the file name decision unit 110 arranges the file names, or file names including directory names, of the files contained in the digital content, in the alphabetical order or the like, and assigns thereto numbers, and determines the file names used as the digital watermarks based on the file name having the assigned number specified by the random number, so that it is possible to locate a set of the newly-generated files used as the digital watermarks in a distributed manner in the digital content to be managed. Accordingly, this makes an effect on that redundancy against attacks such as falsification or removal of a part of digital watermarks can be improved.

Since the digital content management system 1 may be used in combination with various techniques of data hiding, so that the intensity of the digital watermark can be improved by appropriately combining a plurality of techniques.

(Second Exemplary Embodiment)

Figure 13:
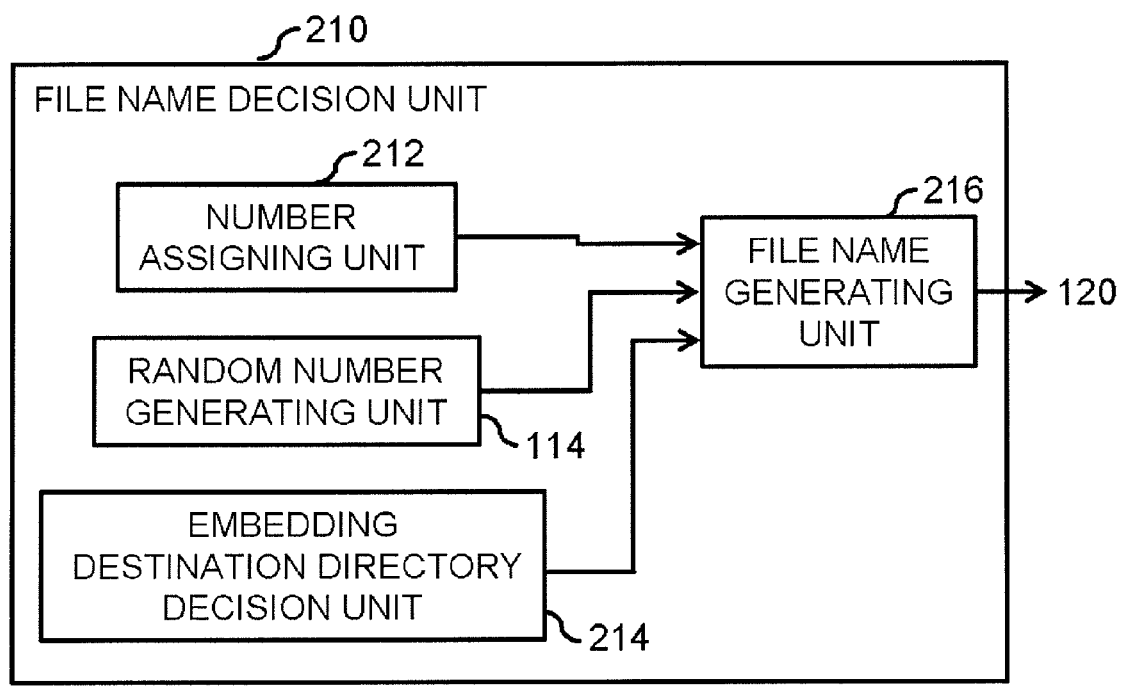
FIG. 13 is a functional block diagram illustrating an exemplary configuration of the file name decision unit of the digital watermark embedding device of the digital content management system according to an exemplary embodiment of the present invention.

FIG. 13 is a functional block diagram illustrating an exemplary configuration of the file name decision unit of the digital watermark embedding device of the digital content management system according to the exemplary embodiment of the present invention.

The digital content management system of this exemplary embodiment is different from that of the above-described exemplary embodiment, in that the files used as the digital watermarks are located in a distributed manner at a uniform probability with respect to the individual existing directories.

In this exemplary embodiment, the file name is defined as an absolute path of the file. Since an overall configuration of the digital content management system of this exemplary embodiment is similar to that illustrated in FIG. 1 explained in the aforementioned exemplary embodiment, the configuration will be explained referring to FIG. 1.

The file name decision unit 210 in this exemplary embodiment has, as illustrated in FIG. 13, a number assigning unit 212 and a file name generating unit 216, in place of the number assigning unit 112 and the file name generating unit 116 in the above-described exemplary embodiment and illustrated in FIG. 2; the random number generating unit 114 similar to that used in the file name decision unit 110; and an embedding destination directory decision unit 214 as a new constituent.

Since the digital watermark embedding device of this exemplary embodiment additionally further includes the embedding destination directory decision unit 214 which determines the directory in the digital content, as a destination of embedding of the file having the file name used as the digital watermark information, so that the digital watermark embedding device embeds the file as the digital watermark into the directory in the digital content determined by the embedding destination directory decision unit 214.

In this exemplary embodiment, the file name decision unit 210 includes the number assigning unit 212 which detects the directories in the digital content, and assigns different numbers to the respective detected directories; and the random number generating unit 114 which generates the random numbers. The embedding destination directory decision unit 214 determines the directories having the numbers corresponding to the generated random numbers, as the destinations of embedding of the files.

In this exemplary embodiment, the number assigning unit 212 assigns the numbers only to the directories in the digital content, and determines unique numbers corresponding to respective directories. A possible method may be such as assigning the numbers in the alphabetical order of the directory names. While the numbers in the aforementioned exemplary embodiment are assigned to both of the files and directories, the numbers in this exemplary embodiment are assigned to the directories only.

The embedding destination directory decision unit 214 determines the directory corresponding to the random number generated by the random number generating unit 114, out of the directory correlated with the assigned value by the number assigning unit 212. This directory serves as the destination of embedding of the new file having the file name used as the digital watermark.

The file name generating unit 216 determines a file name to be generated in the thus-determined directory. Possible methods adoptable herein include a method of generating a random character string and using it as the file name, or a method of adding an extension to the file name.

Figure 14:
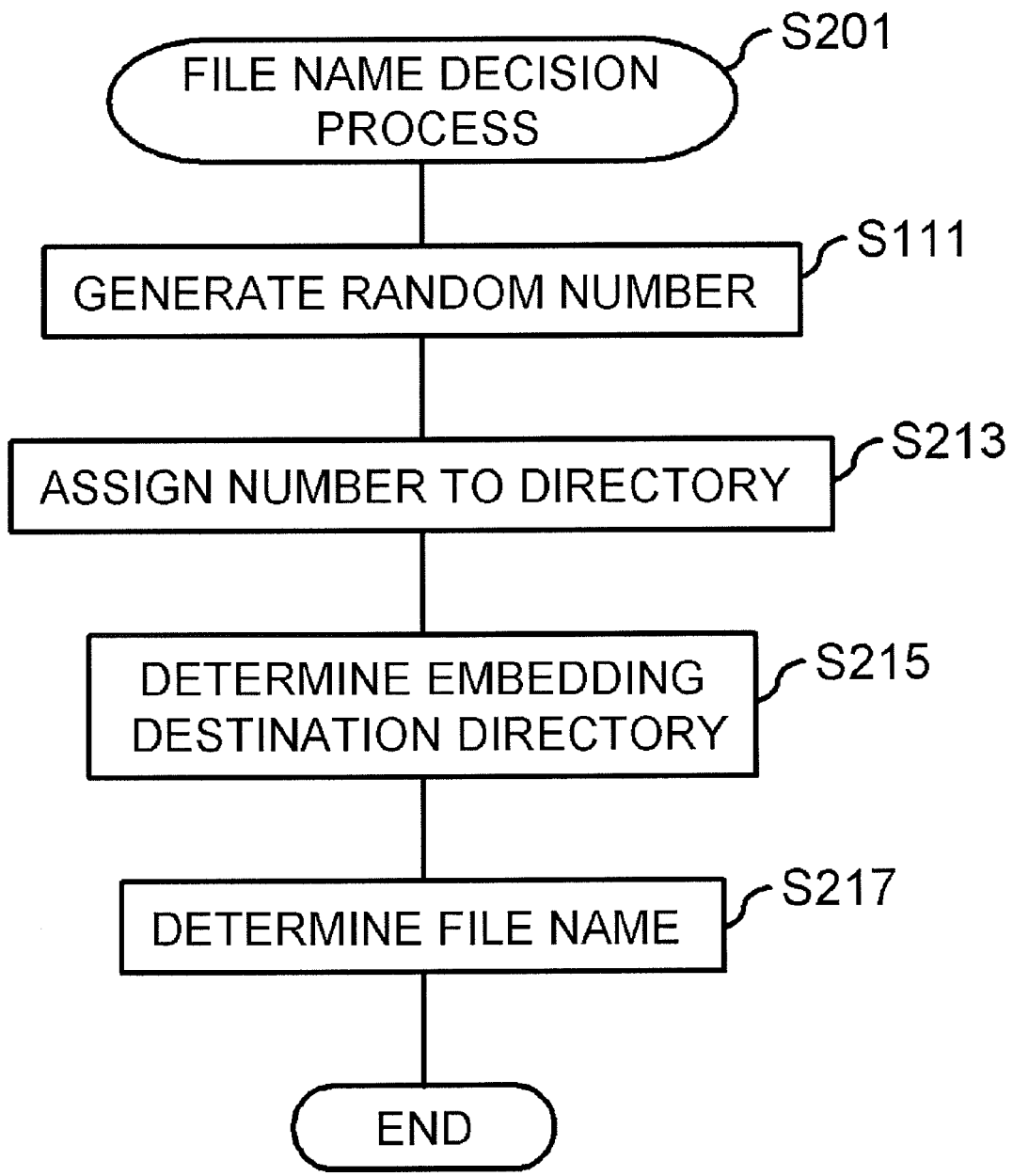
FIG. 14 is a flow chart illustrating an exemplary file name decision process in the digital watermark embedding process executed by the digital content management system of this exemplary embodiment.

Operations of the thus-configured digital content management system of this exemplary embodiment will be explained below. FIG. 14 is a flow chart illustrating an exemplary file name decision process in the embedding of digital watermarks executed by the digital content management system of this exemplary embodiment.

In the digital content management system of this exemplary embodiment, there are two major flows including a digital watermark embedding process of arranging the files used as the digital watermarks in a uniformly distributed manner with respect to the respective directories, and a detection process similar to that described in the aforementioned exemplary embodiment.

<Digital Watermark Embedding Process>

The digital watermark embedding process of this exemplary embodiment is different in the decision process of the file names used as the digital watermarks, in step S101 of the digital watermark embedding process explained in the aforementioned exemplary embodiment referring to FIG. 6. In step S201 of this exemplary embodiment, which is an alternative of step S101 in FIG. 6, the file names for the digital watermarks in the target digital content are generated by using the file name decision unit 210. Step S103 and step S105 are similar to those in the aforementioned exemplary embodiment.

The detailed explanation for the file name determination process in step S101 in FIG. 6 will be described below with reference to FIG. 14. Explanation will be made below with reference to FIG. 13 and FIG. 14.

First, in step S111, which is similar to S111 in the name decision process illustrated in FIG. 7 and described in the aforementioned exemplary embodiment, the random number generating unit 114 generates the same number of random numbers as that of files used as the digital watermarks.

Next, the number assigning unit (212) assigns the numbers respectively to the individual directories in the digital content, so as to determine unique numbers corresponding to respective directory names (step S213). A possible method herein is such as assigning the numbers in the alphabetical order of the directory names.

The embedding destination directory decision unit 214 selects the directories corresponding to the random numbers generated in step S111 using the random number generating unit 114, out of the directories respectively assigned to the values in step S213 by the number assigning unit (212) (step S215). The directories serve as the destinations of embedding of the new files having the file names used as the digital watermarks.

The file name generating unit (216) determines the file names to be generated in the directories having been determined in step S215 by the embedding destination directory decision unit 214 (step S217). Possible methods adoptable herein include a method of generating random character strings and using them as the file names, or a method of adding an extension (txt, dat, exe, etc.) to the file name.

The digital watermark detection process is similar to that of the aforementioned exemplary embodiment, so that the explanation therefore will not be repeated.

As explained in the above, according to the digital content management system of this exemplary embodiment, since the number assigning unit 212 detects the directories in the digital content, and assigns thereto the different numbers; and the embedding destination directory decision unit 214 determines the directories having the numbers corresponding to the generated random numbers as the embedding destinations of the files, so that the files used as the digital watermarks are located in a distributed manner at a uniform probability with respect to the individual existing directories. Accordingly, not only the effects similar to those in the aforementioned exemplary embodiment may be obtained, but also a specific directory may be prevented from being embedded with the digital watermarks in a concentrated manner.

In this way, a specific directory may be prevented from being a weak point against attacks such as removal or falsification of the directories.

(Third Exemplary Embodiment)

Figure 15:
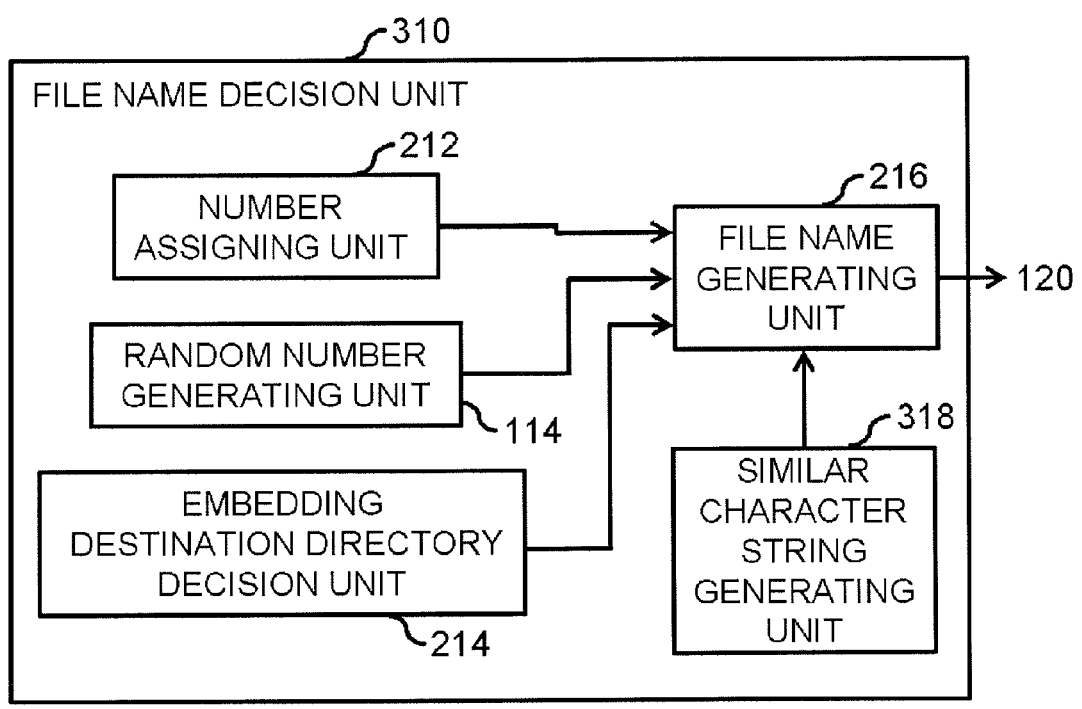
FIG. 15 is a functional block diagram illustrating an exemplary configuration of the file name decision unit of the digital watermark embedding device of the digital content management system according to this exemplary embodiment.

FIG. 15 is a functional block diagram illustrating an exemplary configuration of the file name decision unit of the digital watermark embedding device of the digital content management system according to this exemplary embodiment;

The digital content management system of this exemplary embodiment is different from that in the aforementioned exemplary embodiment, in that the file names newly generated as the watermarks are assimilated to other files in the same directories. Since an overall configuration of the digital content management system of this exemplary embodiment is similar to that illustrated in FIG. 1 explained in the aforementioned exemplary embodiments, the configuration will be explained referring to FIG. 1.

The file name decision unit 310 of this exemplary embodiment has a similar character string generating unit 318 as a new constituent as illustrated in FIG. 15, in addition to the configuration of the file name decision unit 210 of the aforementioned exemplary embodiment illustrated in FIG. 13.

In this exemplary embodiment, the file name decision unit 310 verifies the file names of the files in the directories which serve as the embedding destinations of the digital watermarks, and generates file names similar to the verified file names, as the digital watermarks.

The similar character string generating unit 318 newly generates the file names similar to other file names in the directories selected by the embedding destination directory decision unit 214.

For example, the file names may be generated by procedures (S1) to (S3) below.

(S1) Extract a set of files having an extension which appears at the highest frequency in the folder.

(S2) Extract the information below from the extracted files.

l: average length of file name ext: extension of file name str: character string which appears at the highest frequency in the file names (heading-with match)

(S3) Generate a file name having a form of str***.ext (* represents a random character string) with length l in total, as a part of the watermark.

The file name generating unit 216 uses the similar character string generating unit 318 to determine the file names to be generated in the directories determined by the embedding destination directory decision unit 214. While str in the above example was defined as the character string which appears at the highest frequency in the file names, other various modes are adoptable without being limited thereto.

In one specific example, the similar character string generating unit 318 may determine similarity D of the files and directories in the digital content by using an evaluation function, and may extract a predetermined file set from the folders based on the similarity D.

The evaluation function adoptable herein is any one of the equations (1) to (3) below. The user may select which of evaluation functions to be adopted or also may be permitted to change the coefficients.

[Mathematical Formula 1]

$$D = c1*\text{prefix\_length} + c2*n\_\text{files} - c3*\text{diff\_length} \quad \text{Equation (1)}$$

[Mathematical Formula 2]

$$D = c1*\text{prefix\_length}*c2*n\_\text{files} - c3*\text{diff\_length} \quad \text{Equation (2)}$$

[Mathematical Formula 3]

$$D = \text{prefix\_length}*n\_\text{files}/\text{diff\_length} \quad \text{Equation (3)}$$

where, c1, c2 and c3 represent weighting coefficients, prefix_length represents the length of the same part of character string in names of absolute paths which include files and directories, n_files represents the number of files in the names of the absolute paths each having the same parts of character string, and diff_length represents the length of different part of character string in the names of absolute paths.

Figure 16:
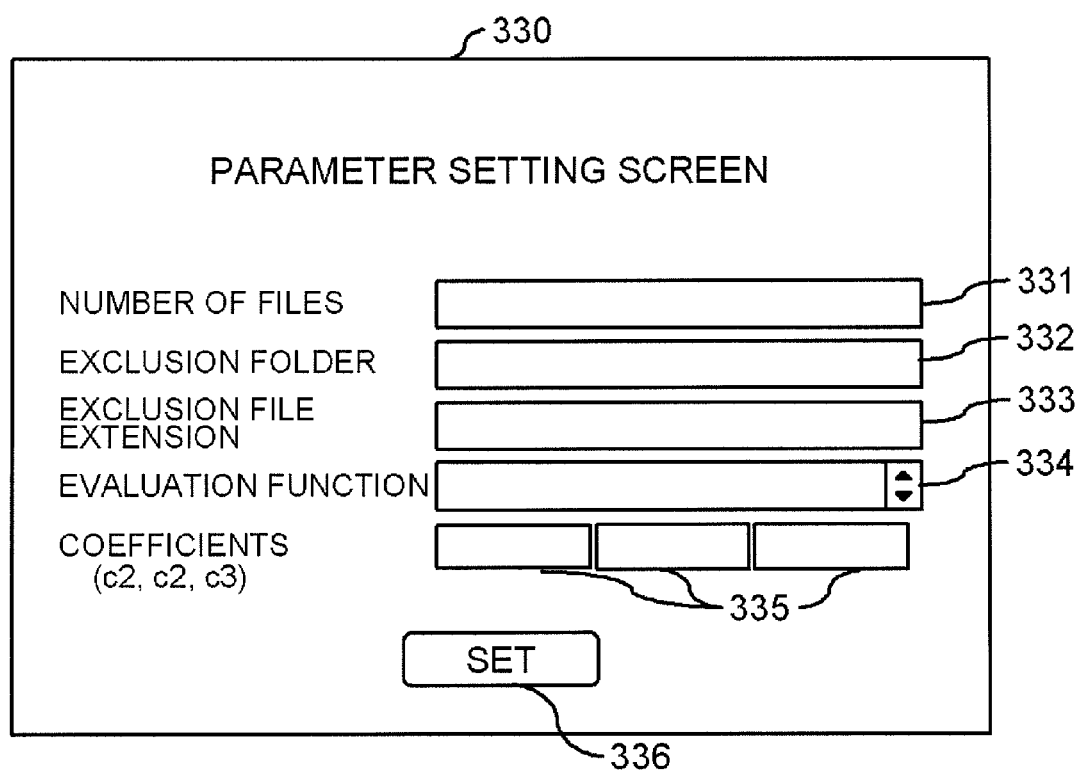
FIG. 16 is a drawing illustrating an exemplary screen for setting parameters for the digital watermark embedding process executed by the digital content management system of this exemplary embodiment.

In the digital content management system of this exemplary embodiment, the user may enter various settings for performing the digital watermark embedding process, through the parameter setting screen 330 of the digital watermark embedding device, illustrated in FIG. 16. More specifically, the parameter setting screen 330 contains a number-of-files entry field 331, an exclusion folder entry field 332, an exclusion file extension entry field 333, an evaluation function selection list 334, an evaluation function coefficient entry field 335, and a setting button 336.

The number-of-files entry field 331 accepts designation of the number of files which have the file names used as the digital watermarks to be embedded into the target digital content to be managed. The exclusion folder entry field 332 accepts designation describing what folders in the target digital content to be managed are excluded as those not allowed for embedding of the digital watermarks. The exclusion file extension entry field 333 accepts designation of extension banned to be used as the digital watermarks, out of the file names generated as the digital watermarks.

The evaluation function selection list 334 accepts selection of the evaluation function used for deciding the file names used as the above-described digital watermarks. The evaluation function coefficient entry field 335 accepts changes made on setting of the coefficients necessary for the evaluation function selected from the evaluation function selection list 334. The individual parameters settable on the parameter setting screen 330 may be given by default. Upon acceptance of pressing of the setting button 336, the settings made on the individual entry fields are accepted, and the individual parameters are stored in the memory.

While this exemplary embodiment will be explained referring to an exemplary case where the similar character string generating unit 318 is added to the configuration of the file name decision unit 210 of the aforementioned exemplary embodiment illustrated in FIG. 13, the exemplary embodiments are not limited thereto, and allows a configuration of the file name decision unit 110, illustrated in FIG. 2, to add the similar character string generating unit 318 thereto. In this case, it may be good enough for example that the file name generated by the similar character string generating unit 318 is processed by fixing the heading character string of the file name so as to correspond with the position of insertion of the digital watermark designated by the random number generating unit 114, and by then assimilating, according to the above-described process, a residual modifiable portion of the file name with the other files in the directory which serves as the embedding destination. The heading character string herein may be fixed typically by fixing at least a certain length of character string, which is enough to determine the embedding destination directory corresponding to the position of insertion designated by the random number generating unit 114.

Figure 17:
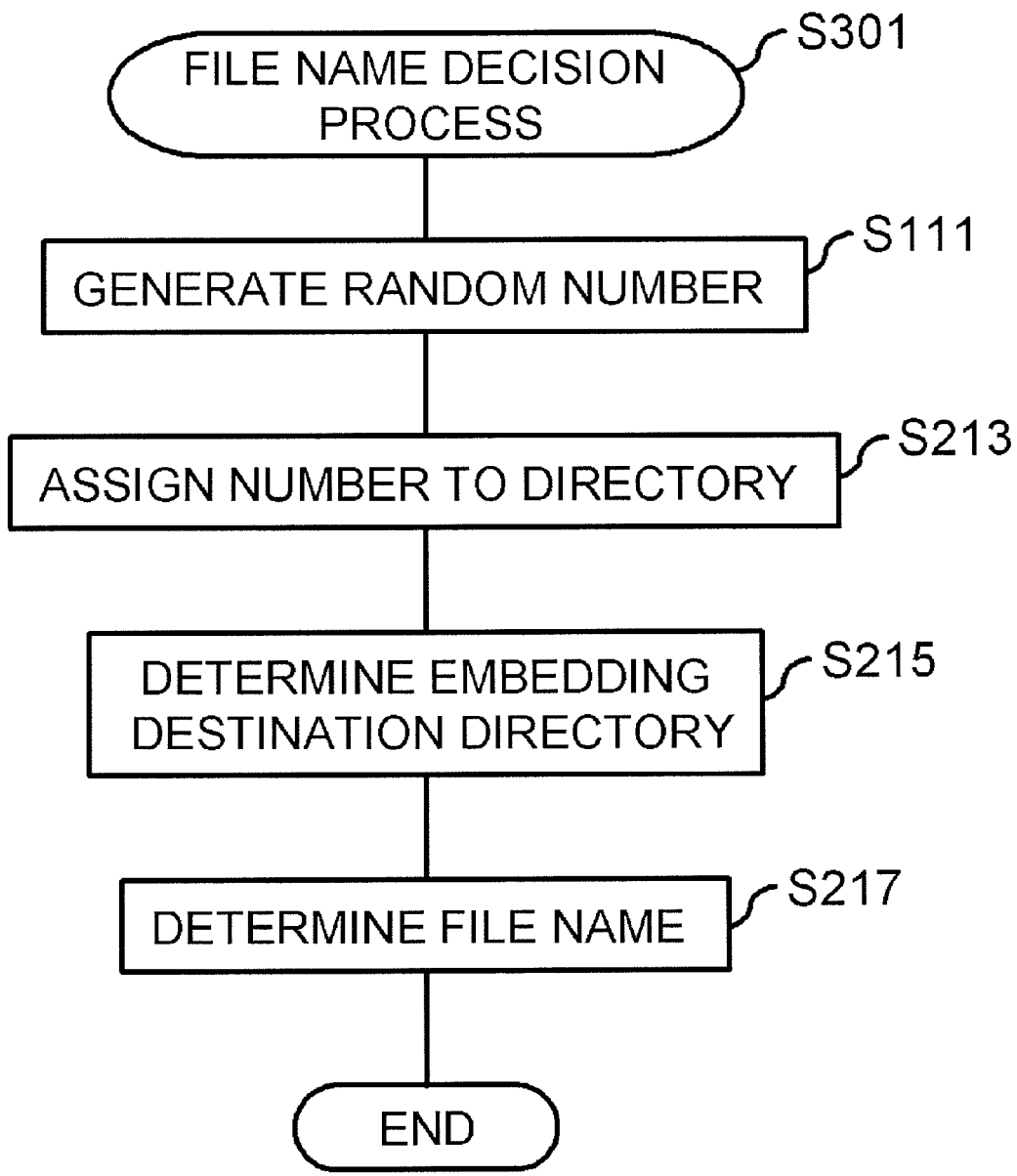
FIG. 17 is a flow chart illustrating an exemplary file name decision process in the digital watermark embedding process executed by the digital content management system of this exemplary embodiment.

Operations of the thus-configured digital content management system of this exemplary embodiment will be explained below. FIG. 17 is a flow chart illustrating exemplary operations in the file name decision process in the digital watermark embedding process executed by the digital content management system of this exemplary embodiment.

In the digital content management system of this exemplary embodiment, there are two major flows including a digital watermark embedding process of assimilating the file names used as the digital watermarks with those of the other files and a detection process similar to that described in the aforementioned exemplary embodiments.

<Digital Watermark Embedding Process>

The digital content management system of this exemplary embodiment is different from the aforementioned exemplary embodiments explained referring to FIG. 6, in the decision process of the file names used as the digital watermarks in step S101 of the digital watermark embedding process. In step S301 of this exemplary embodiment, which is an alternative of step S101 in FIG. 6, the file names used as the digital watermarks to be embedded in the target digital content are generated by using the file name decision unit 310. Step S103 and step S105 are similar to those in the aforementioned exemplary embodiments.

The file name decision process in step S101 in FIG. 6 will be detailed below, referring to FIG. 17. Explanation will be made below referring to FIG. 15 to FIG. 17.

Step S111, step S213, and step S215 in the file name decision process in FIG. 17 are same as those as described in the above exemplary embodiments referring to FIG. 7.

After the step S215, in step S317, the file name generating unit 216 determines, using the similar character string generating unit 318, the file names to be generated in the directories having been determined in step S215 by the embedding destination directory decision unit 214.

The digital watermark detection process is similar to that of the aforementioned exemplary embodiments, so that the explanation therefore will not be repeated.

As described in the above, according to the digital content management system of this exemplary embodiment, since the similar character string generating unit 318 calculates the similarity with the other files in the directory, and generates the file names having high similarity, so as to name the files, used as the digital watermarks, similarly to the other files in the directory, so that confidentiality of the digital watermark will be enhanced. By ensuring the effects similar to those in the aforementioned exemplary embodiments, and by making it more difficult to identify the file from the existing file set in this way, the digital watermark may be more resistive against falsification or removal by the attacker.

The exemplary embodiments of the present invention were described in the above referring to the attached drawings, merely for exemplary purposes, without precluding the adoption of other various configurations.

In the digital content management system of the present invention, the digital watermark embedding device may have at least two of the file name decision unit 110 illustrated in FIG. 2, the file name decision unit 210 illustrated in FIG. 13, and the file name decision unit 310 illustrated in FIG. 15, and may put at least one of them into operation.

While the present invention has been explained referring to the exemplary embodiments and Examples, the present invention is by no means limited by the above-described exemplary embodiments and Examples. Configurations and details of the present invention may be modified in various ways so far as those skilled in the art can understand, within the scope of the present invention.

This application claims priority right based on Japanese Patent Application No. 2009-188083 filed on Aug. 14, 2009, the entire content of which is incorporated hereinto by reference.

The invention claimed is:

1. A digital content management system comprising:
a digital watermark embedding unit which generates a new file which has a file name used as a digital watermark, and embeds the generated new file which has said file name into a digital content to be managed, said digital content including a file set having a plurality of files, said generated file being inserted into said file set of said digital content;
a digital watermark information storage unit which stores, as digital watermark information, said file name used as said digital watermark embedded in said digital content by said digital watermark embedding unit, while correlating said file name with identification information of said digital content having said digital watermark embedded therein; and
a digital watermark detection unit which detects said file name used as said digital watermark, stored in said digital watermark information storage unit, from said digital content to be verified, referring to said digital watermark information stored in said digital watermark information storage unit,
wherein said new file, which has the file name used as the digital watermark, does not include said identification information of said digital content or identification information of said plurality of files contained in said digital content, said new file which has the file name used as the digital watermark is embedded in a said digital content while correlating said file name with identification information of said digital content, and
said digital content management system further comprises a target digital content detection unit which detects the digital content, in which said file name used as said digital watermark is detected by said digital watermark detection unit, as said digital content to be managed,
wherein said digital watermark embedding unit further comprises:
a number assigning unit which detects file names, or file names including directory names, of files contained in said digital content, and assigns different numbers to the respective detected file names;
a random number generating unit which generates random numbers; and
a file name generating unit which specifies the file names having the assigned numbers corresponding to the generated random numbers, and generates the file names used as said digital watermarks based on the specified file names, and,
said digital watermark embedding unit generates files which have said file names generated by said file name generating unit, and embeds said files as said digital watermarks into said digital content.

2. The digital content management system according to claim 1,
wherein said digital watermark embedding unit generates a plurality of said file names and embeds said files respective which have said file names respectively into said digital content,
said digital watermark information storage unit stores said digital watermark information of said plurality of digital watermarks embedded in said digital content by said digital watermark embedding unit, while correlating said digital watermark information with identification information of said digital content, and
said digital watermark detection unit detects at least any one of said plurality of file names used as said digital watermark, stored in said digital watermark information storage unit, from said digital content to be managed, referring to said digital watermark information stored in said digital watermark information storage unit.

3. The digital content management system according to claim 1,
wherein said file name generating unit generates a file name similar to the specified file name as said digital watermark.

4. The digital content management system according to claim 1, further comprising:
a directory determining unit which determines a directory in said digital content, as a destination of embedding of said file which has said file name used as said digital watermark
and
said digital watermark embedding unit embeds said file which has said file name used as said digital watermark into said directory in said digital content determined by said directory determining unit.

5. The digital content management system according to claim 4,
wherein said directory determining unit further comprises:
a number assigning unit which detects directories in said digital content, and assigns different numbers to the respective detected directories; and
a random number generating unit which generates random numbers,
and,
said directory determining unit determines the directories, which have the assigned numbers corresponding to the generated random numbers, as destinations of embedding of said files.

6. The digital content management system according to claim 1,
wherein said digital watermark embedding unit verifies the file name in the directory used as the destination of embedding of said digital watermark, and generates, as said digital watermark, a file name similar to said file name in said directory.

7. The digital content management system according to claim 1,
wherein said digital content includes a file set.

8. The digital content management system according to claim 1,
wherein said digital content is a virtual machine image file.

9. The digital content management system according to claim 1,
wherein said digital watermark embedding unit deals with a plurality of said digital contents to be managed, and embeds said digital watermarks respectively into said respective digital contents, and
said digital watermark information storage unit respectively stores, as said digital watermark information, said file names used as said digital watermarks embedded in said respective digital contents, while correlating said file names with identification information of said respective digital contents.

10. A digital watermark embedding device comprising a digital watermark embedding unit which generates a new file which has a file name used as a digital watermark, and embeds the generated new file, which has a file name used as a digital watermark, into a digital content, said digital content including a file set having a plurality of files, the embedded file being inserted into said file set of said digital content, and
    wherein said new file which has the file name used as the digital watermark does not include identification information of said digital content or identification information of said plurality of files contained in said digital content,
    wherein said digital watermark embedding unit further comprises:
    a number assigning unit which detects file names, or file names including directory names, of files contained in said digital content, and assigns different numbers to the respective detected file names ;
    a random number generating unit which generates random numbers; and
    a file name generating unit which specifies file names having the assigned numbers corresponding to the generated random numbers, and generates the file names used as said digital watermarks based on the specified file names,
    and
    said digital watermark embedding unit embeds said digital watermarks by generating, in said digital content, files which have said file names generated by said file name generating unit.

11. The digital watermark embedding device according to claim 10,
    wherein said file name generating unit generates, as said digital watermark, a file name similar to the specified file name.

12. The digital watermark embedding device according to claim 10, further comprising:
    a directory determining unit which determines a directory in said digital content, as a destination of embedding of said file which has said file name used as said digital watermark,
    and,
    said digital watermark embedding unit embeds said digital watermark by generating said file in said directory in said digital content, determined by said directory determining unit.

13. The digital watermark embedding device according to claim 12,
    wherein said directory determining unit further comprises:
    a number assigning unit which detects directories in said digital content, and assigns different numbers to the respective detected directories; and
    a random number generating unit which generates random numbers,
    and,
    said directory determining unit determines the directories having the assigned numbers corresponding to the generated random numbers, as the destinations of embedding of said files.

14. The digital watermark embedding device according to claim 10,
    wherein said digital watermark embedding unit verifies said file name of said file in said directory used as said destination of embedding of said digital watermark, and generates, as said digital watermark information, a file name similar to said file name said files in said directory.

15. The digital watermark embedding device according to claim 10, further comprising:
    a storage unit which is connected to a digital watermark information storage device, and makes said file name used as said digital watermark, embedded in said digital content by said digital watermark embedding unit, stored as said digital watermark information into said digital watermark information storage device, while correlating it with identification information of said digital content having said digital watermark embedded therein.

16. The digital watermark embedding device according to claim 15,
    wherein said digital watermark embedding unit generates a plurality of said file names and embeds said files which have said file names respectively into said digital content, and
    said storage unit makes said digital watermark information of said plurality of digital watermarks embedded in said digital content by said digital watermark embedding unit, stored respectively into said digital watermark information storage device, while correlating said digital watermark information with identification information of said digital content.

17. The digital watermark embedding device according to claim 15,
    wherein said digital watermark embedding unit embeds said digital watermarks respectively into a plurality of digital contents to be managed, and
    said storage unit makes said file names, stored as said digital watermarks embedded in said respective digital contents, respectively into said digital watermark information storage device, while correlating said file names with identification information of said respective digital contents.

18. The digital watermark embedding device according to claim 10,
    wherein said digital content includes a file set.

19. The digital watermark embedding device according to claim 10,
    wherein said digital content is a virtual machine image file.

20. A digital watermark detection device having a digital watermark detection unit which detects a digital watermark by detecting a file name embedded as said digital watermark in a digital content, said digital content including a file set having a plurality of files, the detected file name having been assigned to a new file which has been generated to be inserted into said file set of said digital content, and
    wherein said new file which has the file name used as the digital watermark does not include identification information of said digital content or identification information of said plurality of files contained in said digital content,
    wherein said digital watermark detection unit refers to said digital watermark information storage device which respectively stores said file names used as said digital watermarks embedded in said plurality of digital contents, while correlating said digital watermark information with said identification information of said respective digital contents.

21. The digital watermark detection device according to claim 20, further comprising:
    a target digital content detection unit which detects, as a target digital content to be managed, a digital content from which said file name used as said digital watermark is detected by said digital watermark detection unit.

22. The digital watermark detection device according to claim 20,
- connected to a digital watermark information storage device which stores, as digital watermark information, said file name used as said digital watermark and embedded in said digital content, while correlating said file name with identification information of said digital content having said digital watermark embedded therein, and,
- said digital watermark detection unit detects said file name used as said digital watermark, stored in said digital watermark information storage unit, from said digital content to be verified, referring to said digital watermark information stored in said digital watermark information storage unit.

23. The digital watermark detection device according to claim 20,
- wherein said digital content includes a file set.

24. The digital watermark detection device according to claim 20,
- wherein said digital content is a virtual machine image file.

25. A non-transitory, computer readable storage medium storing a program for implementing a digital watermark embedding device which embeds a digital watermark into a digital content, configured to make a computer execute a procedure of generating a new file which has a file name used as a digital watermark, and embedding the generated new file which has a file name used as said digital watermark into said digital content, said digital content including a file set having a plurality of files, the embedded file being inserted into said file set of said digital content, and
- wherein said new file which has the file name used as the digital watermark does not include identification information of said digital content or identification information of said plurality of files contained in said digital content;
- a procedure of detecting file names which have file names, or file names including directory names, of files contained in said digital content, and assigning different numbers to the respective detected file names;
- a procedure of generating random numbers;
- a procedure of specifying file names having the assigned numbers corresponding to the generated random numbers, and generating the file names used as said digital watermarks based on the specified file name; and
- a procedure of embedding said digital watermark by generating, in said digital content, a file which has said file name generated in said procedure of generating said file name.

26. The medium according to claim 25, configured to make a computer further execute:
- a procedure of generating, as said digital watermark, a file name similar to the specified file name.

27. The medium according to claim 25, configured to make a computer further execute:
- a procedure of determining a directory in said digital content, which is used as a destination of embedding of said file which has said file name used as said digital watermark; and
- a procedure of embedding said digital watermark by generating said file in the determined directory in said digital content.

28. The medium according to claim 27, configured to make a computer further execute:
- a procedure of detecting directories in said digital content, and assigning different numbers to the respective detected directories;
- a procedure of generating random numbers; and
- a procedure of determining the directories having the assigned numbers corresponding to the generated random numbers, as destinations of embedding of said file.

29. The medium according to claim 25,
- wherein the procedure of embedding is configured to make a computer further execute a procedure of verifying the file name of a file in the directory used as the destination of embedding of said digital watermark, and generating, as said digital watermark information, a file name similar to said file name of said files in the directory.

30. The medium according to claim 25,
- wherein said digital watermark embedding device is connected to a digital watermark information storage device, and
- the program is configured to make a computer further execute a procedure of storing, as digital watermark information, said file name used as said digital watermark embedded in said digital content into said digital watermark information storage device, while correlating said file name with identification information of said digital content having said digital watermark embedded therein.

31. The medium according to claim 30, configured to make a computer further execute:
- a procedure of generating a plurality of file names, and respectively embedding said files which have the generated file names into said digital content; and
- a procedure of respectively storing said digital watermark information of said plurality of digital watermarks embedded in said digital content into said digital watermark information storage device, while correlating said digital watermark information with identification information of said digital content.

32. The medium according to claim 30, configured to make a computer further execute:
- a procedure of respectively embedding said digital watermarks respectively into a plurality of digital contents assumed to be managed; and
- a procedure of storing said file names, used as said digital watermarks embedded in said respective digital contents, into said digital watermark information storage device, while correlating said file names with identification information of said respective digital contents.

33. A non-transitory, computer readable storage medium storing a program for implementing a digital watermark detection device which detects a digital watermark embedded in a digital content,
- being configured to make a computer execute a procedure of detecting said digital watermark by detecting a file name embedded as said digital watermark in said digital content, said digital content including a file set having a plurality of files, the detected file name having been assigned to a new file which has been generated to be inserted into said file set of said digital content, and
- wherein said new file which has the file name used as the digital watermark does not include identification information of said digital content or identification information of said plurality of files contained in said digital content,
- wherein the computer is connected to a digital watermark information storage device which stores, as digital watermark information, said file name used as said digital watermark embedded in said digital content as said digital watermark, while correlating it with identification information of said digital content having said digital watermark embedded therein, said program being configured to make a computer further execute a procedure of detecting said file name used as said digital watermark stored in said digital watermark information storage device, from said digital content to be verified, referring to said digital watermark information storage device.

34. The medium according to claim 33, configured to make a computer further execute, a procedure of detecting a digital content from which said file name used as said digital watermark is detected in said procedure of detecting, as said digital content to be managed.

35. The medium according to claim 33, configured to make a computer further execute a procedure of detecting, from said digital content to be verified, said file names used as said digital watermarks stored in said digital watermark information storage device, referring to said digital watermark information storage device which stores said file names used as said digital watermarks embedded in a plurality of said digital contents to be managed, while correlating said file names with identification information of said respective digital contents.

36. The medium according to claim 25, wherein said digital content includes a file set.

37. The medium according to claim 25, wherein said digital content is a virtual machine image file.

38. A digital content management method comprising:
generating a new file which has a file name used as a digital watermark; and
embedding the generated new file which has a file name used as a digital watermark into a digital content to be managed, said digital content including a file set having a plurality of files, the embedded file being inserted into said file set of said digital content, and
wherein said new file which has the file name used as the digital watermark does not include identification information of said digital content or identification information of said plurality of files contained in said digital content;
detecting file names, or file names including directory names, of files in said digital content, and assigning different numbers to the respective detected file names;
generating a random number;
specifying the file name having the assigned number corresponding to the generated random number;
generating, based on the specified file name, file name used as said digital watermark; and
embedding said digital watermark by generating, in said digital content, the file which has the generated file names.

39. The digital content management method according to claim 38, comprising
generating, as said digital watermark, a file name similar to the specified file name.

40. The digital content management method according to claim 38, comprising:
determining a directory in said digital content, used as a destination of embedding of said file which has said file name used as said digital watermark; and
embedding said digital watermark, by generating said file in the determined directory in said digital content.

41. The digital content management method according to claim 40, comprising:
detecting directories in said digital content, and assigning different numbers to the respective detected directories;
generating a random number; and
determining the directory having the assigned number corresponding to the generated random number as a destination of embedding of said file.

42. The digital content management method according to claim 38, comprising
verifying the file names of the files in the determined directories, and to generate, as said digital watermark information, file names similar to said file names of said files in said directories.

43. A digital content management method comprising
detecting a digital watermark by detecting a file name embedded as the digital watermark in a digital content, said digital content including a file set having a plurality of files, the detected file name having been assigned to a new file which has been generated to be inserted into said file set of said digital content,
wherein said new file which has the file name used as the digital watermark does not include said identification information of said digital content or identification information of said plurality of files contained in said digital content, and
said digital content management method further comprises detecting, as a target digital content to be managed, a digital content from which said file name used as said digital watermark is detected;
generating, by said digital watermark embedding device, a plurality of said file names to embed said file names respectively into said digital content, and
storing, by said digital watermark embedding device, into said digital watermark information storage device, as said digital watermark information, plurality of said digital watermarks embedded in said digital content respectively, while correlating said digital watermark information with identification information of said digital content.

44. A digital content management method comprising:
generating, by digital watermark embedding device, a new file which has a file name used as a digital watermark;
embedding, by a digital watermark embedding device, which is connected to a digital watermark information storage device, the generated new file which has a file name used as a digital watermark in a digital content to be managed, said digital content including a file set having a plurality of files, the embedded file being inserted into said file set of said digital content; and
storing, by said digital watermark embedding device, into said digital watermark information storage device, as digital watermark information, said file name used as said digital watermark embedded in said digital content, while correlating said file name with identification information of said digital content having said digital watermark embedded therein,
wherein said new file which has the file name used as the digital watermark does not include said identification information of said digital content or identification information of said plurality of files contained in said digital content, and
said digital content management method further comprises detecting, as a target digital content to be managed, a digital content from which said file name used as said digital watermark is detected;
generating, by said digital watermark embedding device, a plurality of said file names to embed said file names respectively into said digital content, and
storing, by said digital watermark embedding device, into said digital watermark information storage device, as said digital watermark information, plurality of said digital watermarks embedded in said digital content respectively, while correlating said digital watermark information with identification information of said digital content.

45. The digital content management method according to claim 44, comprising:
embedding, by said digital watermark embedding device, said digital watermarks respectively into a plurality of digital contents to be managed; and
storing, by said digital watermark embedding device, said file names used as said digital watermarks, embedded in said respective digital contents, respectively into said digital watermark information storage device, while correlating said file names with identification information of said respective digital contents.

46. A digital content management method wherein a digital watermark detection device is connected to a digital watermark information storage device which stores, as digital watermark information, a file name used as a digital watermark by generating a new file which has the file name and embedding the generated new file which has the file name into a digital content to be managed, while correlating said file name with identification information of said digital content having said digital watermark embedded therein, said digital content including a file set having a plurality of files, the embedded new file being inserted into said file set of said digital content, the method comprising:
detecting, by said digital watermark detection device, said file name used as said digital watermark stored in said digital watermark information storage device, from a target digital content to be verified, referring to said digital watermark information stored in said digital watermark information storage device, and
wherein said new file which has the file name used as the digital watermark does not include said identification information of said digital content or identification information of said plurality of files contained in said digital content, and
said digital content management method further comprises detecting, as a target digital content to be managed, a digital content from which said file name used as said digital watermark is detected;
generating, by said digital watermark embedding device, a plurality of said file names to embed said file names respectively into said digital content, and
storing, by said digital watermark embedding device, into said digital watermark information storage device, as said digital watermark information, plurality of said digital watermarks embedded in said digital content respectively, while correlating said digital watermark information with identification information of said digital content.

47. The digital content management method according to claim 38,
wherein said digital content includes a file set.

48. The digital content management method according to claim 38,
wherein said digital content is a virtual machine image file.

49. A digital content management system comprising:
a digital watermark embedding means for generating a new file which has a file name used as a digital watermark, and embeds the generated new file which has said file name into a digital content to be managed, said digital content including a file set having a plurality of files, said generated file being inserted into said file set of said digital content;
a digital watermark information storage means for storing, as digital watermark information, said file name used as said digital watermark embedded in said digital content by said digital watermark embedding means, while correlating said file name with identification information of said digital content having said digital watermark embedded therein; and
a digital watermark detection means for detecting said file name used as said digital watermark, stored in said digital watermark information storage means, from said digital content to be verified, referring to said digital watermark information stored in said digital watermark information storage means,
wherein said new file which has the file name used as the digital watermark does not include said identification information of said digital content or identification information of said plurality of files contained in said digital content,
said digital content management system further comprises a target digital content detection means for detecting the digital content, in which said file name used as said digital watermark is detected by said digital watermark detection unit, as said digital content to be managed;
wherein said digital watermark embedding device generates a plurality of said file names to embed said file names respectively into said digital content, and
wherein said digital watermark embedding device stores into said digital watermark information storage device, as said digital watermark information, a plurality of said digital watermarks embedded in said digital content respectively, while correlating said digital watermark information with identification information of said digital content.

50. A digital watermark embedding device comprising a digital watermark embedding means for generating a new file which has a file name used as a digital watermark, and embedding the generated new file, which has a file name used as a digital watermark, into a digital content, said digital content including a file set having a plurality of files, the embedded file being inserted into said file set of said digital content, and
wherein said new file which has the file name used as the digital watermark does not include identification information of said digital content or identification information of said plurality of files contained in said digital content;
wherein said digital watermark embedding device generates a plurality of said file names to embed said file names respectively into said digital content, and
wherein said digital watermark embedding device stores into said digital watermark information storage device, as said digital watermark information, a plurality of said digital watermarks embedded in said digital content respectively, while correlating said digital watermark information with identification information of said digital content.

51. A digital watermark detection device having a digital watermark detection means for detecting a digital watermark by detecting a file name embedded as said digital watermark in a digital content, said digital content including a file set having a plurality of files, the detected file name having been assigned to a new file which has been generated to be inserted into said file set of said digital content, and
wherein said new file which has the file name used as the digital watermark does not include identification information of said digital content or identification information of said plurality of files contained in said digital content;

wherein said digital watermark embedding device generates a plurality of said file names to embed said file names respectively into said digital content, and wherein said digital watermark embedding device stores into said digital watermark information storage device, as said digital watermark information, a plurality of said digital watermarks embedded in said digital content respectively, while correlating said digital watermark information with identification information of said digital content.

52. The digital content management system according to claim 1, wherein said new file which has the file names used as the digital watermark does not include a content constructing the digital content to be managed.

53. The digital content management system according to claim 1, wherein said new file which have the file names used as the digital watermark does not specify said identification information of said digital content or said identification information of said plurality of files contained in said digital content.

54. The digital watermark embedding device according to claim 10, wherein said new file which has the file names used as the digital watermark does not include a content constructing the digital content to be managed.

55. The digital watermark embedding device according to claim 10, wherein said new file which has the file names used as the digital watermark does not specify said identification information of said digital content or said identification information of said plurality of files contained in said digital content.

56. The digital watermark detection device according to claim 20, wherein said new file which has the file names used as the digital watermark does not include a content constructing the digital content to be managed.

57. The digital water mark detection device according to claim 20, wherein said new file which has the file names used as the digital watermark does not specify said identification information of said digital content or said identification information of said plurality of files contained in said digital content.

* * * * *